(12) United States Patent
Hill

(10) Patent No.: US 10,885,704 B1
(45) Date of Patent: Jan. 5, 2021

(54) 3D MAPPING BY DISTINGUISHING BETWEEN DIFFERENT ENVIRONMENTAL REGIONS

(71) Applicant: MICROSOFT TECHNOLOGY LICENSING, LLC, Redmond, WA (US)

(72) Inventor: Erik Alexander Hill, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/560,589

(22) Filed: Sep. 4, 2019

(51) Int. Cl.
*G06T 17/00* (2006.01)
*G06T 17/05* (2011.01)
*G06K 9/00* (2006.01)
*G06T 19/00* (2011.01)

(52) U.S. Cl.
CPC .......... *G06T 17/05* (2013.01); *G06K 9/00664* (2013.01); *G06T 19/006* (2013.01)

(58) Field of Classification Search
CPC ........... G06T 19/006; G06T 2219/2004; G06T 17/05; G06F 3/011
USPC ........................................................ 345/419
See application file for complete search history.

(56) References Cited

U.S. PATENT DOCUMENTS

2016/0289043 A1   10/2016  Fang et al.
2018/0075108 A1    3/2018  Park et al.
2019/0147649 A1    5/2019  Brochu

FOREIGN PATENT DOCUMENTS

EP          0840880 A1   5/1998

OTHER PUBLICATIONS

"International Search Report and Written Opinion Issued in PCT Application No. PCT/US20/037989", dated Sep. 8, 2020, 13 Pages.

*Primary Examiner* — Thomas J Lett
(74) *Attorney, Agent, or Firm* — Workman Nydegger

(57) ABSTRACT

Improved techniques for mapping an environment are disclosed herein. These improvements are achieved by distinguishing between different environmental regions and by selectively using scanning data of the environment to generate a 3D representation of at least one, but not all, of the environment's regions. Initially, 3D depth scanning data is accessed. A boundary associated with the environment is identified. This boundary divides the environment into at least two regions, including a first and second region. Based on the boundary, a first portion of the scanning data is classified as corresponding to the first region and a second portion of the scanning data is classified as corresponding to the second region. After filtering the second portion from the scanning data, the filtered scanning data is used to generate the 3D representation. Consequently, the 3D representation is limited by the boundary and visually represents the first region but not the second.

20 Claims, 17 Drawing Sheets

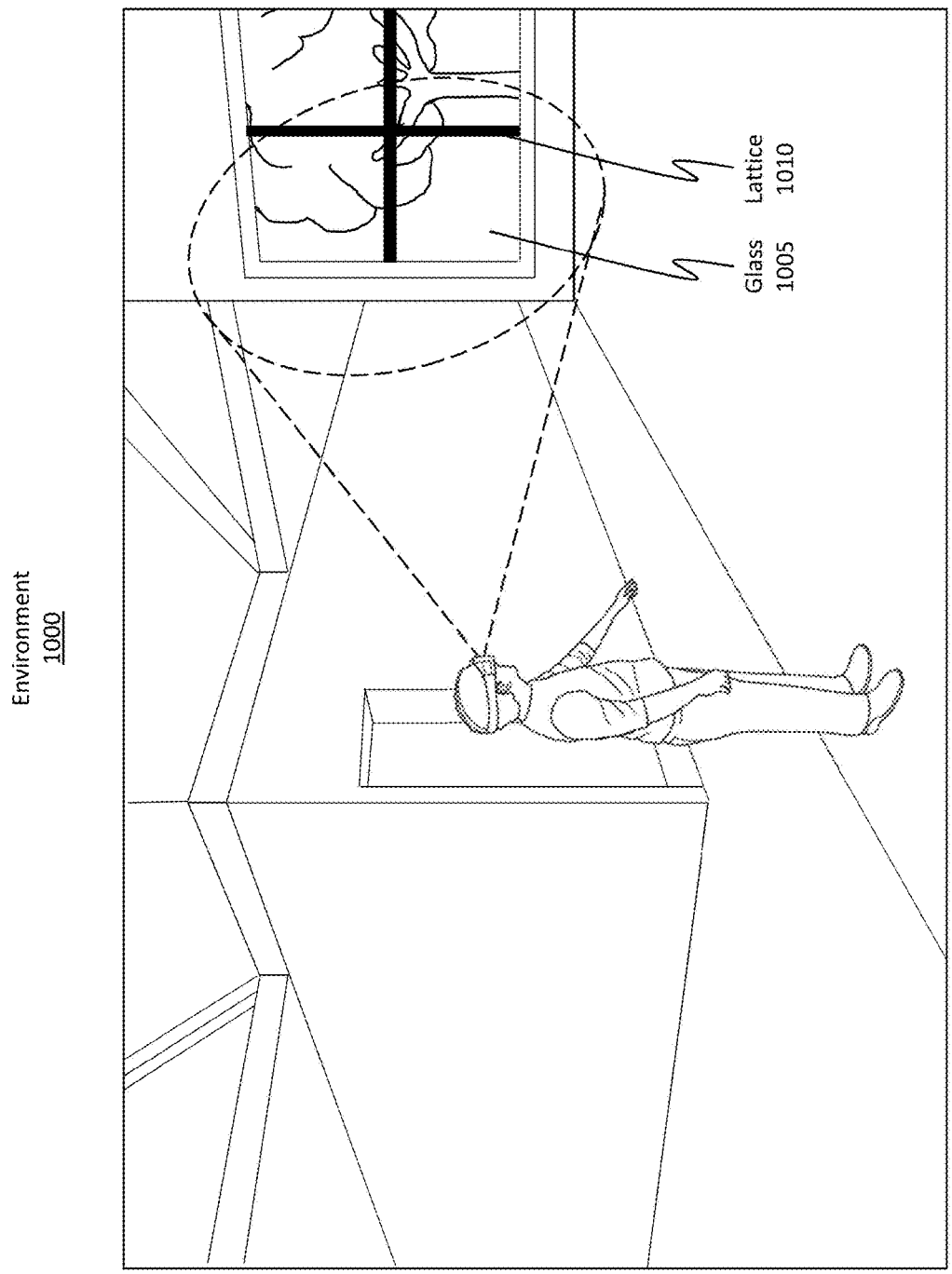

Filtered Data 1200

3D MAPPING BY DISTINGUISHING BETWEEN DIFFERENT ENVIRONMENTAL REGIONS

BACKGROUND

Mixed-reality (MR) systems/devices include virtual-reality (VR) and augmented-reality (AR) systems. Conventional VR systems create completely immersive experiences by restricting users' views to only virtual images rendered in VR scenes/environments. Conventional AR systems create AR experiences by visually presenting virtual images that are placed in or that interact with the real world. As used herein, VR and AR systems are described and referenced interchangeably via use of the phrase "MR system." As also used herein, the terms "virtual image," "virtual content," and "hologram" refer to any type of digital image rendered by an MR system. Furthermore, it should be noted that a head-mounted device (HMD) typically provides the display used by the user to view and/or interact with holograms provided within an MR scene.

An MR system's HMD typically includes one or more different depth detection sensors that facilitate generating a three-dimensional (3D) representation of an environment. That is, these sensors are used to scan and map out the environment, including any objects in the environment, in order to generate the 3D representation.

Mapping the environment using these sensors often works best when the environment is static (i.e. there are no or few moving objects in the environment). When moving objects are located in the environment, however, then the data produced by the scanning sensors is often skewed and creates a so-called "moving wall" or "ghosting effect" within the 3D representation. This moving wall is an improper visualization representative of the moving objects. In effect, the moving wall causes the 3D representation to represent the environment in an inaccurate manner.

Traditional technology has addressed this frustration in a particular manner. By way of example, consider a trade exposition in which HMDs (or any type of scanning sensor) are being showcased. As is common with expositions, many observers are present within the environment to witness how the products function. When it comes to the use of an HMD or scanning sensor (hereinafter just the term "HMD" will be used as an envelope term to refer to either an HMD or a scanning sensor), however, the presence of observers in the environment will cause the HMD to create the moving wall phenomenon. As a result, traditional solutions to this problem are focused on distancing the HMD away from observers, such as by placing the HMD in an arcade room so as to cordon off the HMD from being subject to the effects of an observer's presence. To clarify, traditional techniques cause the user and the HMD to be placed in a different room, or perhaps a curtained off area.

Unfortunately, by placing the HMD in a different room, the observers are no longer able to directly witness how the HMD functions or how the user interacts with the HMD. Sometimes, there is a camera in the cordoned-off room, and observers can watch via an external television, but using a television as an intermediary device often detracts from the true observational experience. Nevertheless, these traditional techniques are still followed. Consequently, there is a substantial need in the technical field to improve how environments are mapped when those environments include dynamic or moving objects (i.e. when the environments are not static environments).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein are directed to systems, methods, and devices (e.g., HMDs, scanning devices, hardware storage devices, etc.) that improve how environments are mapped by selectively differentiating between different regions of an environment and by selectively using scanning data of the environment to generate a three-dimensional (3D) representation of at least one, but not all, of the regions.

In some embodiments, scanning data is initially accessed. This scanning data was generated by a scanning sensor that was used to scan an environment. Furthermore, this scanning data includes depth information used to generate a 3D representation of the environment. A boundary associated with the environment is also identified. This boundary is provided to divide the environment into at least two regions. These regions include (i) a first region that is at least partially scanned by the scanning sensor and that extends only up to the boundary (e.g., the region between the HMD and the boundary) and (ii) a second region that is also at least partially scanned by the scanning sensor and that originates at and extends beyond the boundary. Based on the identified boundary, a first portion of the scanning data is classified as corresponding to the first region, and a second portion of the scanning data is classified as corresponding to the second region. After filtering the second portion from the scanning data, the filtered scanning data is then used to generate the 3D representation of the environment. Consequently, the 3D representation is limited by the boundary and is visually representative of the first region but not the second region even though the second region was at least partially scanned by the scanning sensor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 10 illustrates how different patterns, lattices, or frameworks can be used as a boundary to differentiate between different regions of the environment.

DETAILED DESCRIPTION

Figure 1:
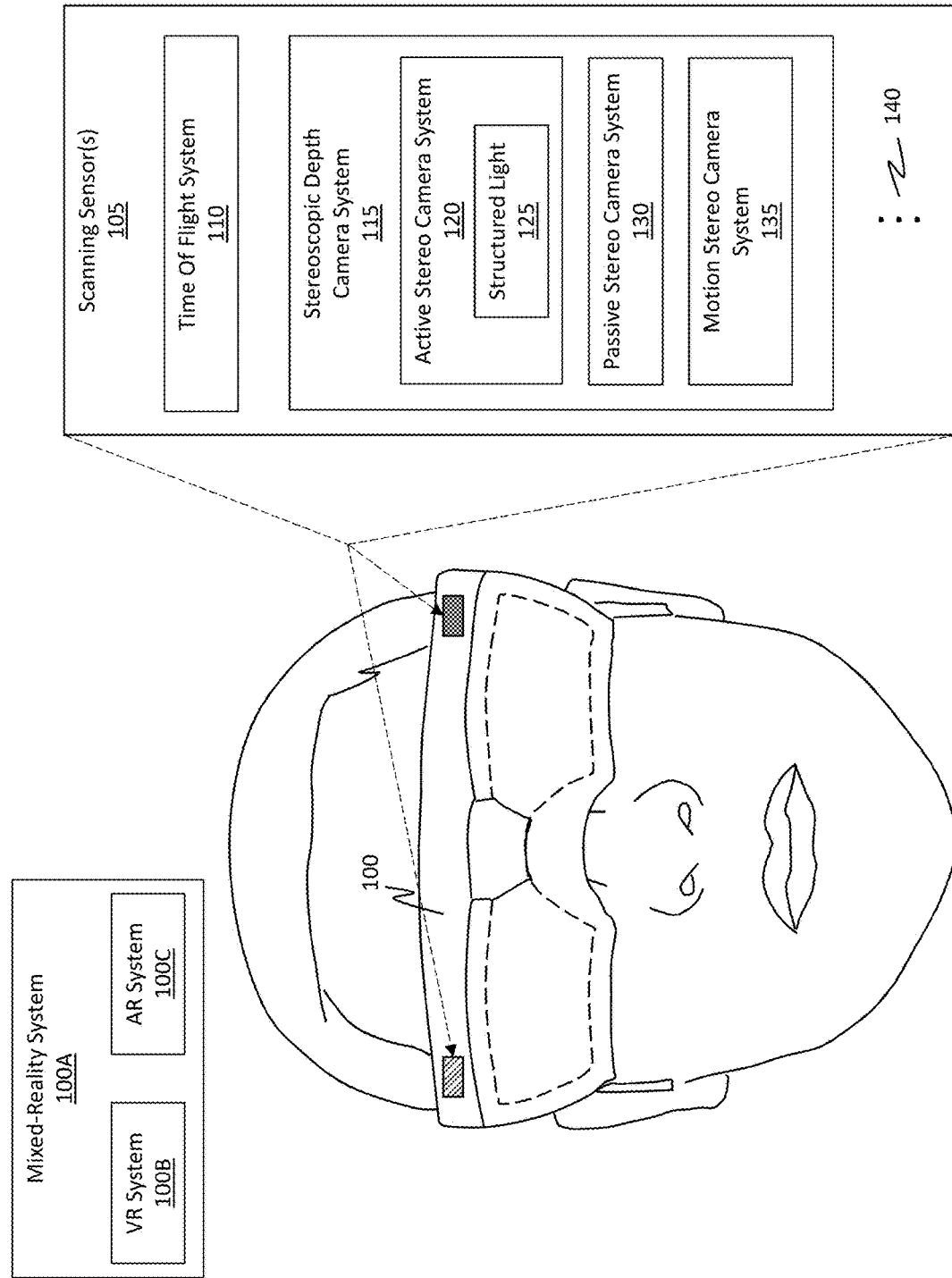
FIG. 1 illustrates an example head-mounted device (HMD) that is shown as including any number or type of different scanning sensor(s).

Embodiments disclosed herein are directed to systems, methods, and devices (e.g., HMDs, scanning devices, hardware storage devices, etc.) that improve 3D scanning and mapping by selectively using scanning data to generate a three-dimensional (3D) representation of at least one, but not all, of the environment's regions. In this regard, at least some of these operations are performed to eliminate the effects of so-called "moving walls." It should be noted that while a majority of this disclosure is focused on the use of an HMD to perform the disclosed operations, any type of scanning sensor can be used.

In some embodiments, scanning data, which was generated by a scanning sensor that was used to scan an environment, is accessed. This scanning data includes depth information used to map out the environment. A boundary associated with the environment is identified, where the boundary divides the environment into at least two regions. These regions include (i) a first region that is at least partially scanned by the scanning sensor and that extends only up to the boundary and (ii) a second region that is also at least partially scanned by the scanning sensor and that originates at and extends beyond the boundary. Based on the boundary, a first portion of the scanning data is determined to correspond to the first region, and a second portion is determined to correspond to the second region. After filtering the second portion from the scanning data, the filtered scanning data is then used to generate a 3D representation of the environment.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

Although techniques are in place to generate depth maps for environments, these techniques are quite inadequate with regard to mapping out non-static, or rather dynamic, environments. To clarify, the disclosed embodiments provide substantial benefits to the technical field by improving how highly dynamic environments are mapped. Because dynamic environments are prevalent, the disclosed embodiments provide real and practically applicable improvements for depth sensing and detection.

In some cases, the disclosed embodiments bring about these improvements by performing operations that may seem contrary to traditional techniques. That is, traditional techniques typically prevent the collection of scanning data corresponding to dynamic objects. If there is no scanning data for dynamic objects, then the resulting 3D representation should not evidence the moving wall phenomenon. Accordingly, traditional techniques have focused on isolating scanning sensors to prevent collecting scanning data for dynamic objects.

In contrast to these traditional techniques, the disclosed embodiments purposefully do capture scanning data for dynamic objects. Because the embodiments additionally use a so-called "boundary," which will be discussed in more detail later, the embodiments are then able to selectively filter, ignore, or disregard the effects of the presence of the dynamic objects. To clarify, use of the boundary enables the disclosed embodiments to improve how mapping is performed because the boundary operates as a triggering mechanism for determining which scanning data to use and which scanning data to disregard. Therefore, while traditional techniques attempted to address the moving wall problem by distancing/isolating the scanning sensors, the disclosed embodiments provide beneficial solutions through the use of the disclosed boundary.

In this regard, the disclosed embodiments are directed to techniques that improve depth mapping of an environment. These techniques are especially beneficial for environments containing dynamic or moving objects. Accordingly, by relying on the use of the disclosed boundary, the embodiments are able to obtain improved depth signals and measurements for an environment. These processes can be performed for any type of environment or area, and can be performed by any type of scanning sensor (and not just HMDs).

The embodiments also improve the efficiency of the computing system or architecture by selectively reducing or culling the amount of data used to generate a 3D representative. By using less scanning data, the embodiments beneficially free up compute resources and can also extend the battery life of the scanning sensor or HMD. Additionally, the embodiments improve the user experience as well as the spectator experience. The user's experience is improved because the user will not have to be isolated in another room and the resulting 3D representation will be improved, thus enabling more detailed and accurate holograms to be provided to the user. The spectator's experience will be improved because now he/she will be able to directly witness how the user interacts with the HMD as opposed to potentially having to view those interactions through an intermediate device (e.g., a television).

Scanning Sensor Technology

Attention will now be directed to FIG. 1, which illustrates an example of a head-mounted device (HMD) 100. HMD 100 can be any type of mixed-reality system 100A, including a virtual-reality system 100B or an augmented-reality system 100C. It should be noted that while a substantial portion of this disclosure is focused on the use of an HMD to scan a room, the embodiments are not limited to only being practiced using an HMD. That is, any type of scanning system can be used, even systems entirely removed or separate from an HMD. As such, the disclosed principles should be interpreted broadly to encompass any type of scanning scenario or device.

HMD 100 is also shown as including scanning sensor(s) 105, and the HMD 100 can use the scanning sensor(s) 105 to scan and map any kind of environment. Scanning sensor(s) 105 may comprise any number or any type of scanning devices used to scan and map out an environment (e.g., by generating a 3D representation of the environment). As used herein, a "3D representation" includes, but is not limited to, any type of surface reconstruction mesh (e.g., a mesh that includes polygons describing the shapes, geometries, and contours of an environment), a 3D point cloud (e.g., a compilation of dots or points that are used to digitally represent the environment), depth maps, or any other 3D digital representation of the environment.

The scanning sensor(s) 105 can be used to scan and map out an environment, including any objects in the environment. To do so, the scanning sensor(s) 105 typically uses its depth sensors (e.g., depth cameras) to obtain one or more depth images of the environment. These depth images include depth data detailing the distance from the sensor to any objects captured by the depth images (e.g., a z-axis range or measurement). Once these depth images are obtained, then a depth map can be computed from the data in the images. A depth map details the positional relationship and depths relative to objects in the environment. Consequently, the positional arrangement, location, geometries, contours, and depths of objects relative to one another can be determined. From the depth maps (and possibly the depth images), a 3D representation of the environment can be generated.

As shown, in some embodiments, scanning sensor(s) 105 include a time of flight system 110 and/or a stereoscopic depth camera system 115. Both of these types of depth sensing systems are generally known in the art and will not be described in detail herein.

In some embodiments, the stereoscopic depth camera system 115 may be configured as an active stereo camera system 120, which projects light (e.g., visible light and/or infrared light) into the environment to better determine depth. In some cases, the projected/illuminated light is structured light 125 (e.g., light that is projected using a known pattern so as to provide artificial texture to the environment). In some embodiments, the stereoscopic depth camera system 115 is configured as a passive stereo camera system 130 or perhaps even as a motion stereo camera system 135. The ellipsis 140 is provided to illustrate how the scanning sensor(s) 105 may include any number and/or any other type of depth sensing unit. As such, the embodiments are not limited only to those units shown in FIG. 1.

Distancing A Scanning Sensor to Prevent Capturing Dynamic Data

Figure 2:
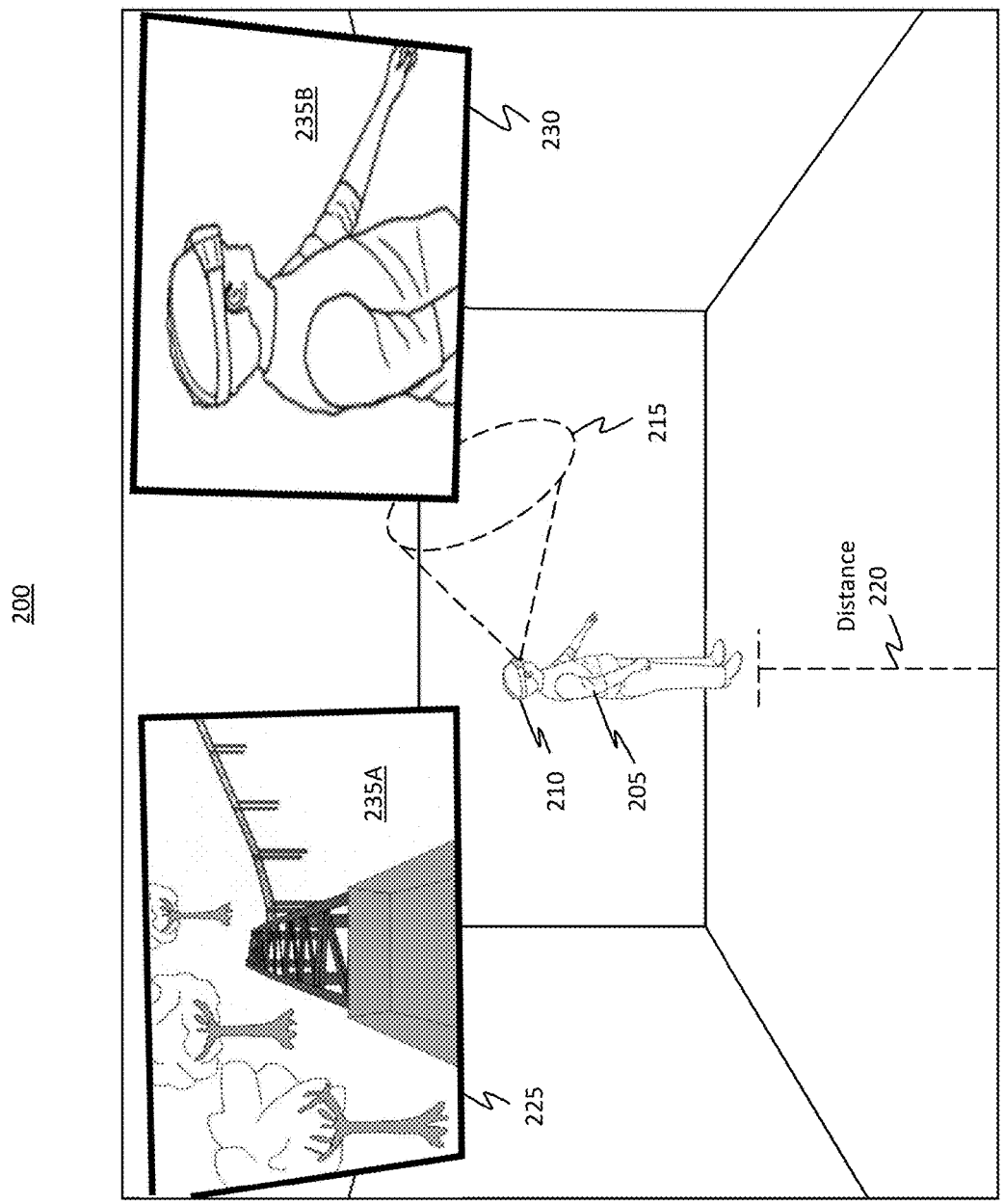
FIG. 2 illustrates an example scenario in which a person is testing out an HMD. Previously, any observers who wanted to watch the person were required to stand far enough away so as to not impact the HMD's scanning sensors. If the observers were too close to the HMD, then their presence would cause the HMD to generate the so-called "moving wall" or "ghosting effect."
Figure 3:
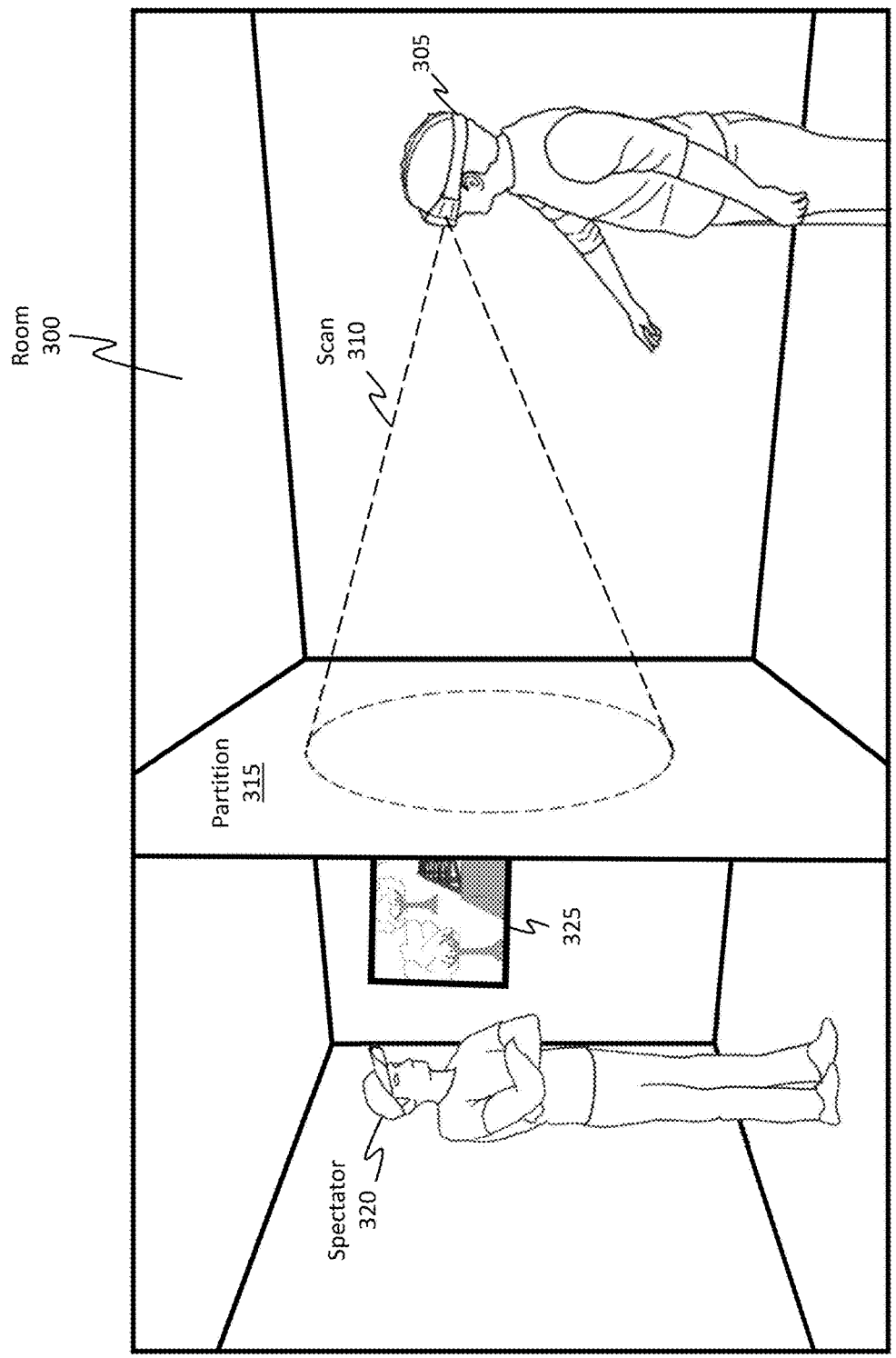
FIG. 3 illustrates another scenario in which observers were previously restricted from being able to watch HMD users.

The following discussion now refers to FIGS. 2 and 3, which generally describe some techniques in which a scanning sensor was physically placed or isolated away from dynamic objects to prevent the capture of "dynamic data." As used herein, the phrase "dynamic data" generally refers to 3D scanning data representative of "dynamic" (i.e. non-static or moving) objects located within an environment.

Turning first to FIG. 2, there is shown an environment 200 which is representative of a first type of exposition area. Environment 200 includes a user 205 wearing an HMD 210. HMD 210 may be configured in the manner described in connection with FIG. 1. Here, HMD 210 is using its scanning sensors to scan 215 environment 200 in an effort to map out environment 200. Scanning environment 200 is beneficial because it enables HMD 210 to better determine where and how to place virtual images for the user 205 to view and interact with. In accordance with traditional practices, any observers were required to stand back a determined distance 220 from the user 205 to ensure that the presence of those observers did not negatively impact the scan 215 operation. Instead of being near the user 205, the observers were required to view the user 205 and the scene being projected for the user using a set of televisions (e.g., television 225 and television 230).

Here, television 225 is showing an MR scene 235A that is being projected via the HMD 210 for the user 205 to view and interact with. Additionally, television 230 is showing a recording 235B of the actual user 205 while the user 205 is engaging with the MR scene. Often, observers want to not only observe the MR scene 235A, but they also want to observe how the user 205 interacts with that MR scene 235A. Previously, however, the observers were required to view these interactions either from a remote distance or via an intermediary device, such as television 230.

FIG. 3 illustrates another related scenario to that shown in FIG. 2. Specifically, FIG. 3 shows an isolated room 300 in which a user is wearing an HMD 305. HMD 305 is scanning the room (e.g., as shown by scan 310). Here, room 300 is shown as including a completely obstructive partition 315 that entirely blocks a spectator 320 from being able to observe the behavior of the user. Instead, spectator 320 is required to watch the user via any number of televisions (e.g., television 325). Isolating a user from spectators/observers is not desirable. Consequently, there is a substantial need in the technical field to improve how "dynamic environments" are mapped. As used herein, the phrase "dynamic environment" refers to an environment that includes any number of non-static, moving objects. As also used herein, the term "dynamic" refers to objects that are moving (or that are identified as objects that often move or that move a threshold amount even if they are not currently moving) while the term "static" refers to non-moving objects (or objects that are identified as not moving very often or not moving a threshold amount).

Improved Techniques for Mapping Out Dynamic Environments

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
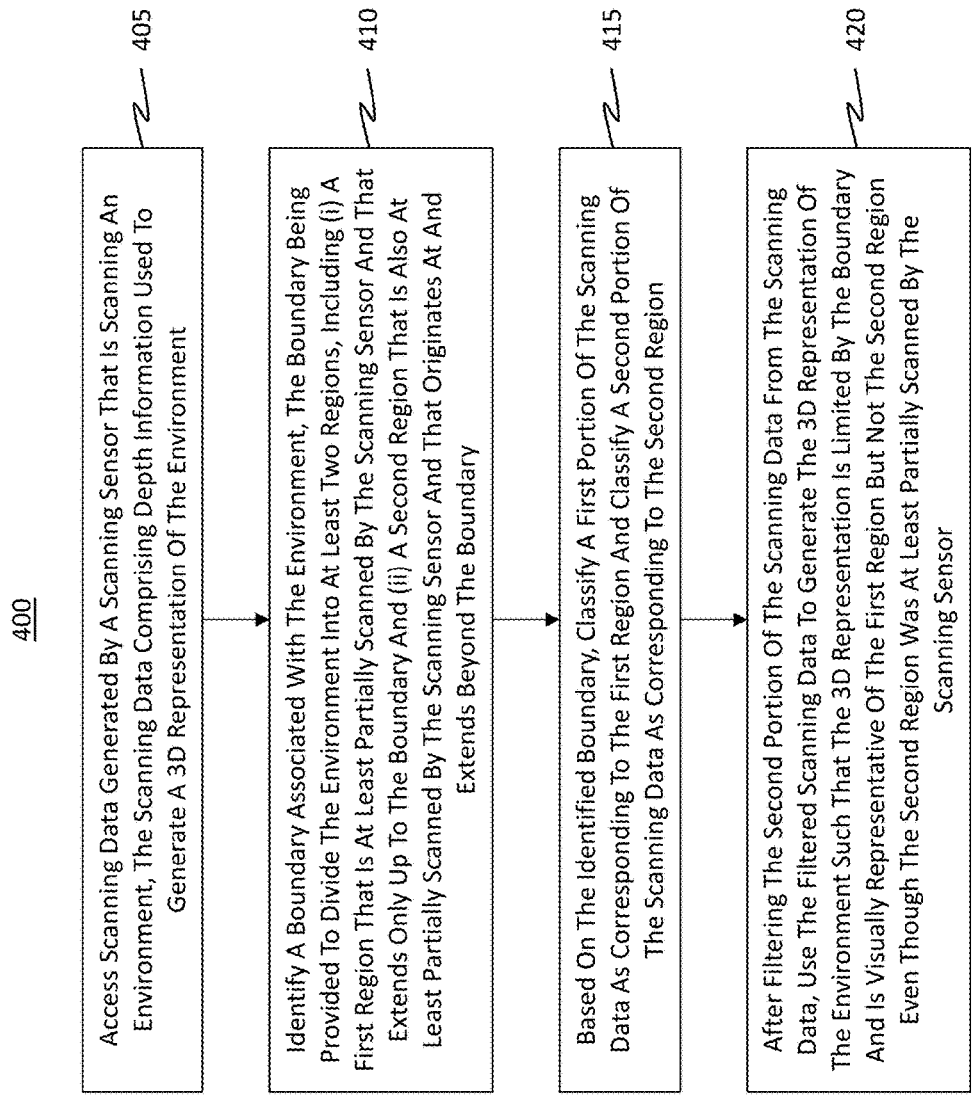
FIG. 4 illustrates a flowchart of an example method for improving how scanning sensors scan and map an environment to prevent the resulting 3D representation from having a moving wall.

FIG. 4 illustrates a flowchart of an example method 400 for differentiating between different regions in an environment (e.g., a dynamic environment) and for selectively using scanning data of the environment to generate a 3D representation of at least one, but not all, of the regions in the environment. Initially, method 400 includes an act (act 405) of accessing scanning data generated by a scanning sensor that is or was scanning an environment. This scanning data comprises depth information used to generate the 3D representation of the environment.

In some cases, an HMD (e.g., HMD 100 of FIG. 1) is currently being used to generate the scanning data described in method act 405. As such, the scanning data can be provided in real-time as it is being generated. In other cases, the scanning data may have been generated previously but made currently accessible. For instance, the scanning data may be retained in system storage or memory. In some cases, the scanning data may have been uploaded to a cloud service and storage. As such, the process of "accessing" scanning data should be interpreted broadly to include scenarios in which the scanning data is presently being generated and accessed as well as scenarios in which the scanning data was previously generated but is currently being made available or accessible.

Additionally, any type of scanning sensor (e.g., scanning sensor(s) 105 from FIG. 1) may be used. In some cases, the scanning sensor may be an integral part of an HMD while in other cases the scanning sensor may be an independent device separate from an HMD.

Figure 5:
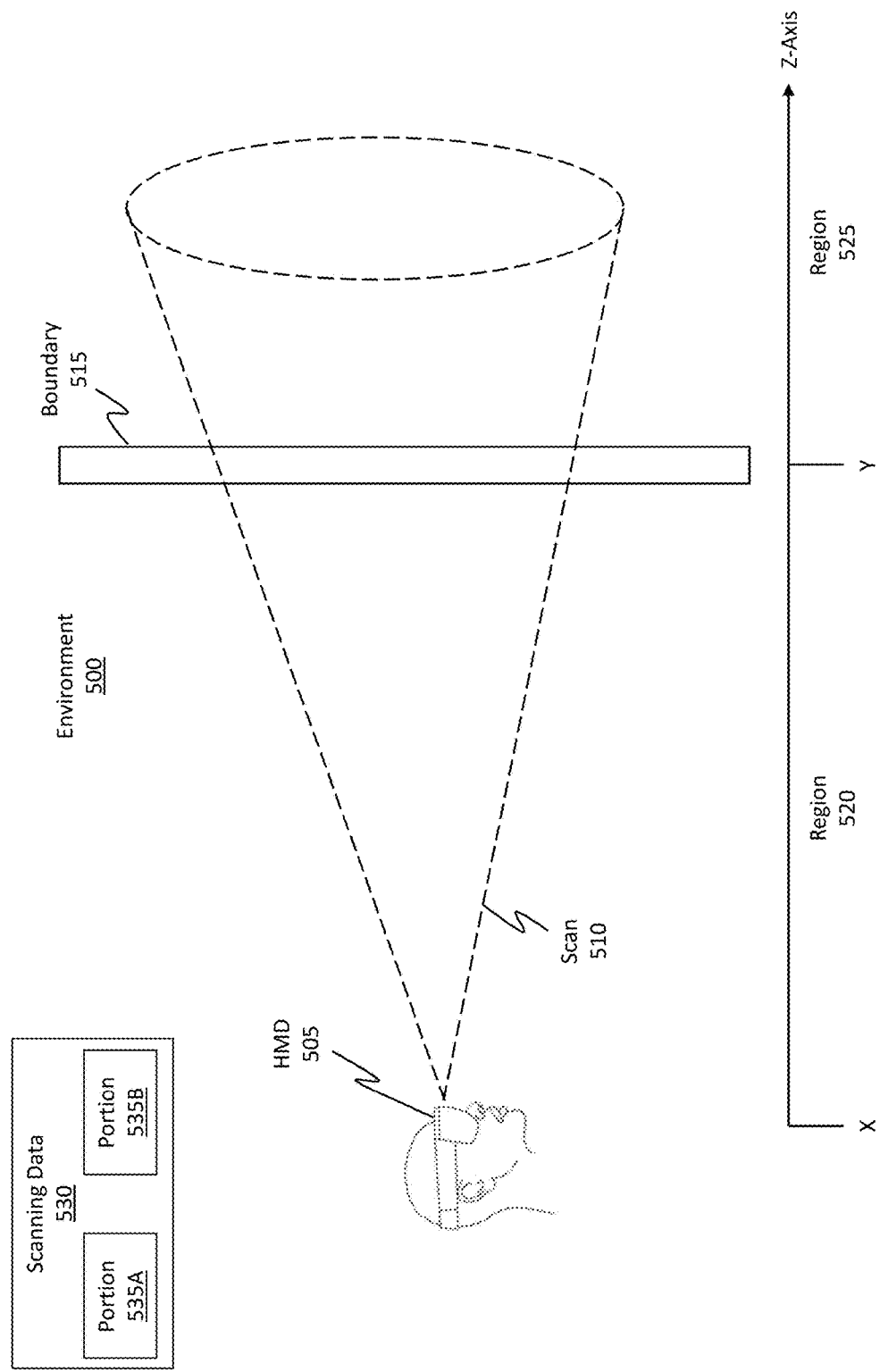
FIG. 5 illustrates how a boundary can be used to distinguish between different regions in an environment. Using this boundary, the embodiments can then selectively control how the resulting 3D representation of the environment is generated.

Turning briefly to FIG. 5, there is shown an example of an environment 500, which may be representative of the environment discussed in connection with method 400 of FIG. 4. Here, an HMD 505, which may be representative of the HMDs discussed thus far, is shown as scanning environment 500 (e.g., as shown by scan 510). By scanning the environment, HMD 505 is generating scanning data comprising depth information of any objects in environment 500.

Returning to FIG. 4, method 400 also includes an act (act 410) of identifying a boundary associated with the environment. This boundary, which may be a real-world physical boundary (e.g., a boundary that is at least partially transparent or a boundary with see-through sections) or a virtual boundary, is provided to divide the environment into at least two regions. Additional characteristics of the boundary will be discussed later. In any event, the two regions formed by the boundary at least include (i) a first region that is at least partially scanned by the scanning sensor and that extends only up to the boundary and (ii) a second region that is also at least partially scanned by the scanning sensor and that originates at and extends beyond the boundary.

With reference to FIG. 5, boundary 515 is representative of the boundary discussed in method act 410. Boundary 515 is shown as dividing, partitioning, sectioning, or otherwise separating environment 500 into a number of different regions, areas, or portions. For instance, as shown, boundary 515 is dividing environment 500 into a first region 520 and a second region 525. Although only two regions are shown, it will be appreciated that any number of boundaries may be used and any number of regions may be produced by the boundaries.

The first region 520 is shown as at least originating at the HMD 505 and extending up to, but not surpassing, the boundary 515 in the z-axis direction. In this regard, the first region 520 is positioned between the labels "X" and "Y" in the environment 500 along the z-axis.

Similarly, the second region 525 is shown as at least originating at and extending beyond the boundary 515. Specifically, the second region 525 is positioned as beginning at the label "Y" and extending (perhaps indefinitely or in an unbounded manner) in the z-axis direction. In any event, the boundary 515 operates as a divider between the first region 520 and the second region 525.

Returning to FIG. 4, method 400 also includes an act (act 415) where, based on the identified boundary, the embodiments classify a first portion of the scanning data as corresponding to the first region and classify a second portion of the scanning data as corresponding to the second region. By way of example, FIG. 5 shows how the HMD 505 generated scanning data 530. In accordance with method act 415 of FIG. 4, the scanning data 530 can be analyzed to identify portions corresponding to the first region 520 and portions corresponding to the second region 525, based on the positioning of the boundary 515.

For instance, portion 535A of scanning data 530 corresponds to the first region 520 and portion 535B of scanning data 530 corresponds to the second region 525. The disclosed embodiments are able to analyze depth data included in the scanning data 530 to identify where (in terms of relative depth) the boundary 515 is positioned within environment 500. Depth data for depths leading up to the depth of the boundary 515 can be classified or grouped among the portion 535A. Similarly, depth data for depths originating at and extending beyond the boundary 515 can be classified or grouped among the portion 535B. Accordingly, the placement location of the boundary 515 can be used to classify the different depths as belonging to either portion 535A or portion 535B.

In some embodiments, the environment 500 can be scanned at an initial, earlier time, prior to the presence of any dynamic objects. Later on, the environment can be rescanned. To detect the presence of dynamic objects, the embodiments can perform a diff operation between the first, initial scan and the later scan. Any difference between the two scans (which are identified as a result of performing the diff operation) can be identified as potentially corresponding to dynamic objects. Based on the results of the diff operation, the embodiments can then establish the boundary using various different techniques, which will be discussed in further detail later. Accordingly, some embodiments may additionally rely on an initial baseline mapping of the environment when performing the disclosed operations. Other embodiments, however, perform a single scan and identify dynamic objects in another manner, which will be discussed later.

Returning to FIG. 4, after filtering, removing, or otherwise discarding the second portion of the scanning data from the scanning data (to thereby produce "filtered scanning data"), method 400 includes an act (act 420) of using the filtered scanning data to generate the 3D representation of the environment. As a consequence, the 3D representation is limited by the boundary and is visually representative of the first region but not the second region even though the second region was at least partially scanned by the scanning sensor. In this regard, the disclosed embodiments operate by using the boundary as a triggering or distinguishing mechanism to selectively filter out some scanning data and to prevent the filtered-out data from being used to generate the resulting 3D representation.

It should be noted that the disclosed "boundaries" are structured or configured in a manner that is quite different from the boundaries used in the traditional technologies. That is, while the traditional technology relied on an entirely opaque or substantially opaque boundary to prevent the scanning sensor from obtaining scanning data for regions extending beyond the boundary, the disclosed boundaries are actually transparent, see-through, non-opaque, non-obstructive, or perhaps even virtual (i.e. not a real-world physical boundary). As a noted consequence of these characteristics, the disclosed scanning sensor is able to obtain scanning data for regions extending beyond the boundary whereas traditional techniques did not obtain scanning data for regions beyond their dividers, barriers, or boundaries.

Boundary Characteristics

Figure 6:
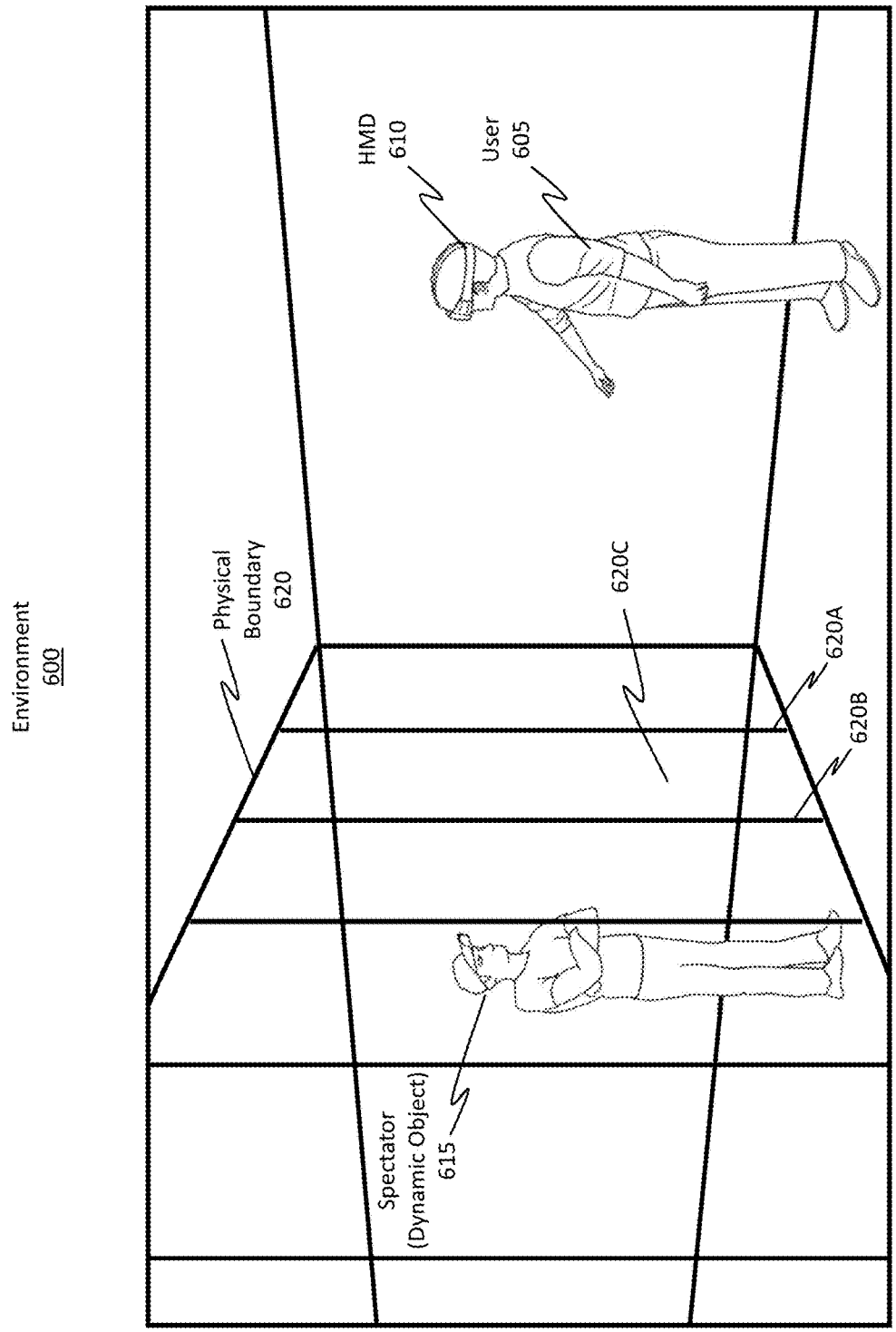
FIG. 6 illustrates another example of a boundary and how the boundary can be used to selectively control how the 3D representation is generated.

FIG. 6 shows an example environment 600, which may be representative of the environments discussed earlier. Additionally, FIG. 6 shows a user 605 wearing an HMD 610, which may also be representative of the HMDs discussed thus far. Furthermore, there is a spectator 615, who is an example of a "dynamic object," watching the user 605 interact with an MR scene provided by the HMD 610.

Environment 600 is specifically shown as including a real-world physical boundary 620 comprised of any number of discrete separators (e.g., separator 620A, 620B, and 620C). These separators can be formed from any type of material (e.g., wood, cloth, curtain, metal, plastic, and so on) without limitation. Additionally, the distance between the separators can be set to any value, without limitation. Example values include 0.1 meters, 0.25 meters, 0.5 meters, 0.75 meters, 1.0 meters, 2.0 meters, 3.0 meters, and so on. Indeed, any separation distance may be used. A notable characteristic of this physical boundary 620 is that the HMD 610 is able to scan areas or regions extending beyond the location of the physical boundary 620. For instance, the HMD 610 is able to generate scanning data corresponding to the spectator 615 because the spectator 615 is visible or observable to the HMD 610.

Based on the depiction provided by FIG. 6, spectator 615 is positioned near HMD 610 and is able to clearly see user 605. Distances that are classified as being "near" are generally within 1 to 6 meters of the HMD 610, though other distances may be used as well. In some embodiments, the head tracking and scene understanding range of an HMD 610 extends up to about 6 meters away. Thus, being "near" relative to the HMD 610 means that the spectator 615 may be included within the current scanning range of the HMD 610 (e.g., about 6 meters). Of course, the scanning range may change depending on the application (e.g., scanning performed for head tracking, which extends up to about 6 meters, typically extends farther than scanning performed for hand tracking, which extends up to about 1 meter). Accordingly, in some embodiments, being "near" simply refers to being included within the current scanning range of the HMD 610 while in other embodiments being "near" is within a threshold distance (e.g., 1-6 meters) of the HMD 610. Depending on the scanning abilities of the HMD 610, the scanning range may extend even beyond 6 meters, such as 7 meters, 8 meters, 9 meters, 10 meters, or beyond 10 meters.

In the scenario shown in FIG. 6, the disclosed embodiments are able to identify the physical boundary 620 through any number of different processes. In some embodiments the physical boundary 620 is identified as a result of performing semantic segmentation on the environment 600 using any form of machine learning.

As used herein, "machine learning" may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically identify objects, including the physical boundary 620, within the environment 600.

In some embodiments, the physical boundary 620 is identified by analyzing the resulting scanning data to detect the presence of a physical obstruction (i.e. physical boundary 620) within the environment 600. In some embodiments, the HMD 610 is able to automatically recognize or determine that the physical boundary 620 is provided to divide environment 600 into different regions. For instance, HMD 610 can scan the room/environment to determine whether the room includes dynamic objects. If the room is absent of dynamic objects, then there may not be a need to use a boundary to divide the environment into different regions so as to filter out dynamic objects. On the other hand, if dynamic objects are identified from the scanning data, then the embodiments can attempt to automatically select or detect a boundary. For instance, HMD 610 can scan the room/environment to identify any number of potential candidate boundaries. To be selected as a candidate, the boundary may be required to satisfy a threshold number of criteria or requirements. Some of these criteria include being at least partially see-through or transparent so that the scanning sensor can sense objects beyond the boundary. Another criterion is that the boundary itself is not a dynamic object (e.g., the boundary will not move). Other types of boundaries will be described later.

Another criterion may be the number of dynamic objects that are located in front of the boundary and that are located beyond the boundary. If the boundary is supposed to act as a triggering mechanism for determining which scanning data is to be filtered, then it is beneficial for the boundary to be located at a position so as to achieve a maximum or increased filtering efficiency. That is, it is beneficial for the boundary to be located at a position where dynamic objects can be filtered out of the scanning data. Accordingly, some criteria may be based on a determined efficiency of filtering that would result if the candidate boundary were selected (e.g., would this boundary result in filtering out a threshold percentage of dynamic objects).

Once a determined number of candidate boundaries are identified, then the embodiments can apply weights to the different candidates based on their corresponding attributes and based on any number of policy considerations. These candidates can then be ranked based on the weights. The candidate with the highest ranking (or some other selection factor) can then be selected to operate as the boundary. It should be noted that any number of boundaries may be used and that the boundaries can even change over time. As such, the embodiments are not limited to selecting only a single boundary nor are they limited to using only a specific one boundary during an entire time period. If a new boundary is identified, which new boundary evidences improved characteristics over a currently-used boundary, then the new boundary can be used during the processes described in method 400 of FIG. 4.

In some additional or alternative embodiments, user input can be received to select the physical boundary 620 as being the boundary discussed in connection with method 400 of FIG. 4. By way of example, some embodiments perform an initial calibration or setup procedure prior to displaying an MR scene. During this initial step, the HMD 610 can scan the room and ask the user to provide input regarding whether the user wants to select an object to operate as a boundary to divide the room. The user can enter user input via use of the HMD 610, such as by virtually selecting the physical boundary 620 (e.g., by pointing to the physical boundary 620 and selecting it).

Figure 7:
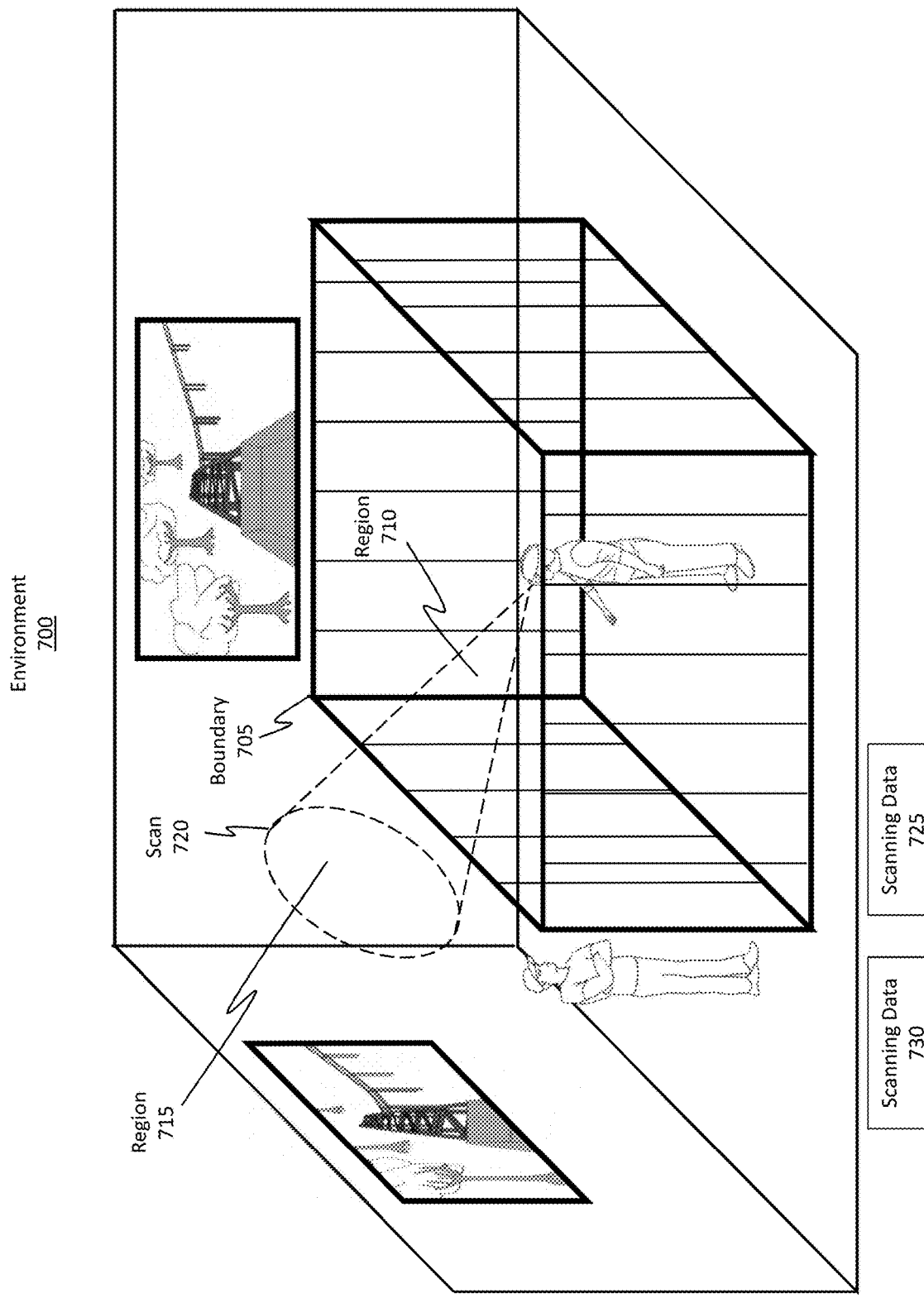
FIG. 7 illustrates yet another example of the use of a boundary, which may be a real-world physical boundary.

FIG. 7 shows another scenario that is somewhat similar to the scenario shown in FIG. 6. Specifically, FIG. 7 shows an environment 700 that includes a boundary 705. Boundary 705 operates to divide the environment 700 into at least two regions (though more than two regions may be created). Here, there is shown a first region 710, which is included within the confines of the boundary 705, and a second region 715, which is the area outside of the confines of the boundary 705. FIG. 7 also shows how an HMD is performing a scan 720 of environment 700 to produce at least two sets of scanning data (e.g., scanning data 725 and scanning data 730).

Here, scanning data 725 corresponds to region 710 and scanning data 730 corresponds to region 715. Because region 715 is located beyond the boundary 705, it is desirable to filter the scanning data 730 from consideration. Furthermore, the embodiments are able to use the boundary 705 to distinguish between the two different sets of scanning data. As a consequence of performing these filtering operations, the resulting 3D representation of environment 700 will describe only region 710 (i.e. the area confined by boundary 705) and will not describe region 715. As a further consequence, the 3D representation will not be negatively impacted (i.e. it will not include a moving wall) that would otherwise occur as a result of the spectator moving around within region 715. Accordingly, scanning data 730 can constitute the "second portion" of scanning data, as described in connection with FIG. 4. This second portion includes data describing a dynamic object (e.g., the observer shown in FIG. 7) located in the second region 715, which extends beyond the boundary 705. The data describing the dynamic object can then be selectively filtered such that the data is refrained from being used to generate the resulting 3D representation.

Figure 8:
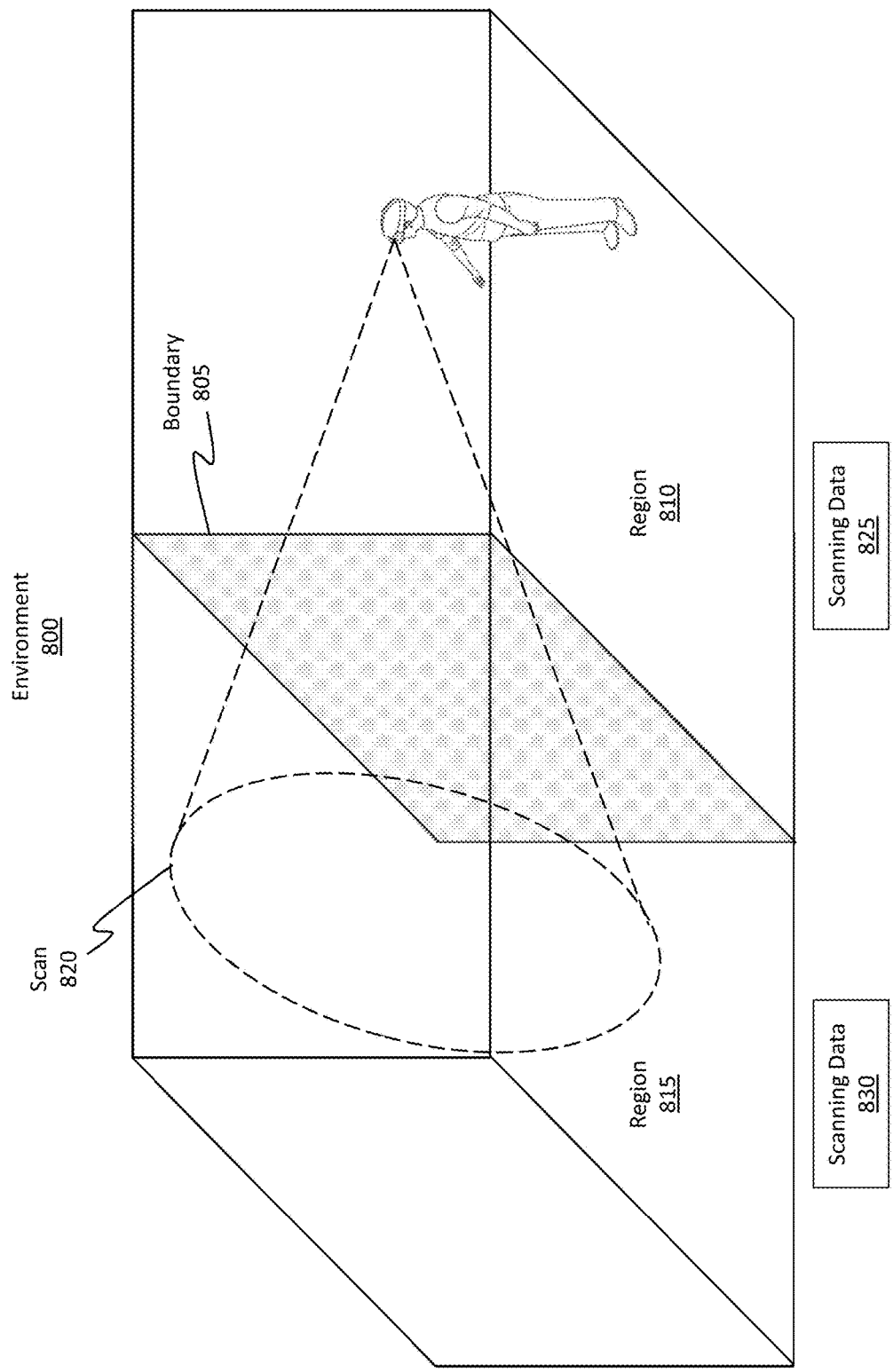
FIG. 8 illustrates how the boundary can be a virtual geofence.

Whereas the discussion up to this point has been focused on relying on a physical boundary to divide an environment, some embodiments rely on a virtual boundary. For instance, FIG. 8 shows an environment 800 that is divided into multiple regions via a boundary 805. Here, boundary 805 is not a physical real-world boundary; rather, boundary 805 is a virtual boundary, such as a geofence. As shown, boundary 805 is dividing environment 800 into at least two regions, including region 810 and region 815. Region 810 at least extends from the user's HMD up to the boundary 805, and region 815 originates at the boundary 805 and extends outward away from the HMD.

During a scan 820 of environment 800, the embodiments generate scanning data of the entire environment 800. This scanning data can then be classified as having at least two separate groups of data. For instance, scanning data 825 can correspond to region 810, based on the position of the boundary 805, and scanning data 830 can correspond to region 815, based on the position of the boundary 805. Furthermore, the embodiments are able to use the different portions of scanning data to distinguish between objects located within region 810 and objects located within region 815.

It will be appreciated that the boundary 805 (i.e. a virtual boundary) can be generated in a number of different ways. In some embodiments, a virtual boundary is generated based on scanning data of the environment. For instance, the HMD can initially scan the environment. Based on this scan, the HMD can determine whether any dynamic objects are located in the environment. For example, the determination can be based on seemingly invalid depth data, such as ghosting effects that occur from a moving object. The determination can also occur based on depth variances between a window or group of depth pixels in a depth image. If the depth variance between any number of selected pixels within the window is too high (e.g., it exceeds a predetermined variance threshold), then it may be the case that the depth image captured a dynamic object. Regardless of which technique is used, once dynamic objects are located, then a depth of those objects can be determined. Based on that depth, the embodiments can then impose a geofence at a position that is a threshold distance proximate to the determined depth of the dynamic object. An example will now be helpful.

Suppose, by way of example, that a spectator is located 3 meters away from the HMD in FIG. 8. The HMD can initially be used to scan environment 800. If the spectator is moving during the scanning operation, then the depth data may be skewed and may include ghosting or streaking data occurring as a result of the spectator moving. Even if the spectator is not moving during the scanning operation, the embodiments can still perform semantic segmentation on the depth data to determine that the spectator is a dynamic object and that the scanning data corresponding to the spectator should not be included in the resulting 3D representation of environment 800.

Once the relative distance or depth of the spectator is known or determined (e.g., in this case it was about 3 meters), then the embodiments can apply a geofence around the HMD. This geofence boundary can be a threshold distance away from the depth of the spectator. Of course, this threshold distance can be set to any value. Example threshold distances include 0.25 meters, 0.5 meters, 0.75 meters, 1.0 meters, and so on. Supposing the threshold distance were set to 0.25 meters, the embodiments can establish a geofence around the HMD at a location about 2.75 meters away from the HMD in the direction of the spectator (thus the geofence is 0.25 meters away from the spectator). Of course, the size or shape of the geofence can vary depending on the structure or layout of environment 800 as well as the presence of any other spectators. That is, the shape of the geofence is not restricted or limited to any particular shape (e.g., a circle, oval, rectangle, square, and so on). Instead, the shape of the geofence can be environment- and/or dynamic-object specific. Furthermore, the shape can change over time as new spectators enter or leave the environment. Additionally, user input can be used to establish the shape and other characteristics of the geofence.

Once the geofence is established, then the HMD can continue to obtain scanning data for region 810 as well as region 815. Here, however, the scanning data for region 815 will be filtered and will not be considered when the resulting 3D representation is generated. As a consequence, the 3D representation will extend up to the area where the boundary 805 is located, but it will not extend beyond that area.

In some cases, the depth data included as a part of the scanning data 830 (i.e. the data to be filtered) can be tagged, flagged, or otherwise marked. These markings can be provided to indicate that this data should not be considered when generating a 3D representation. In some cases, the tagged data can be deleted while in other cases the tagged data can be retained in storage. It may be the case that the tagged data can be used for other purposes and thus should not be deleted.

Figure 9A:
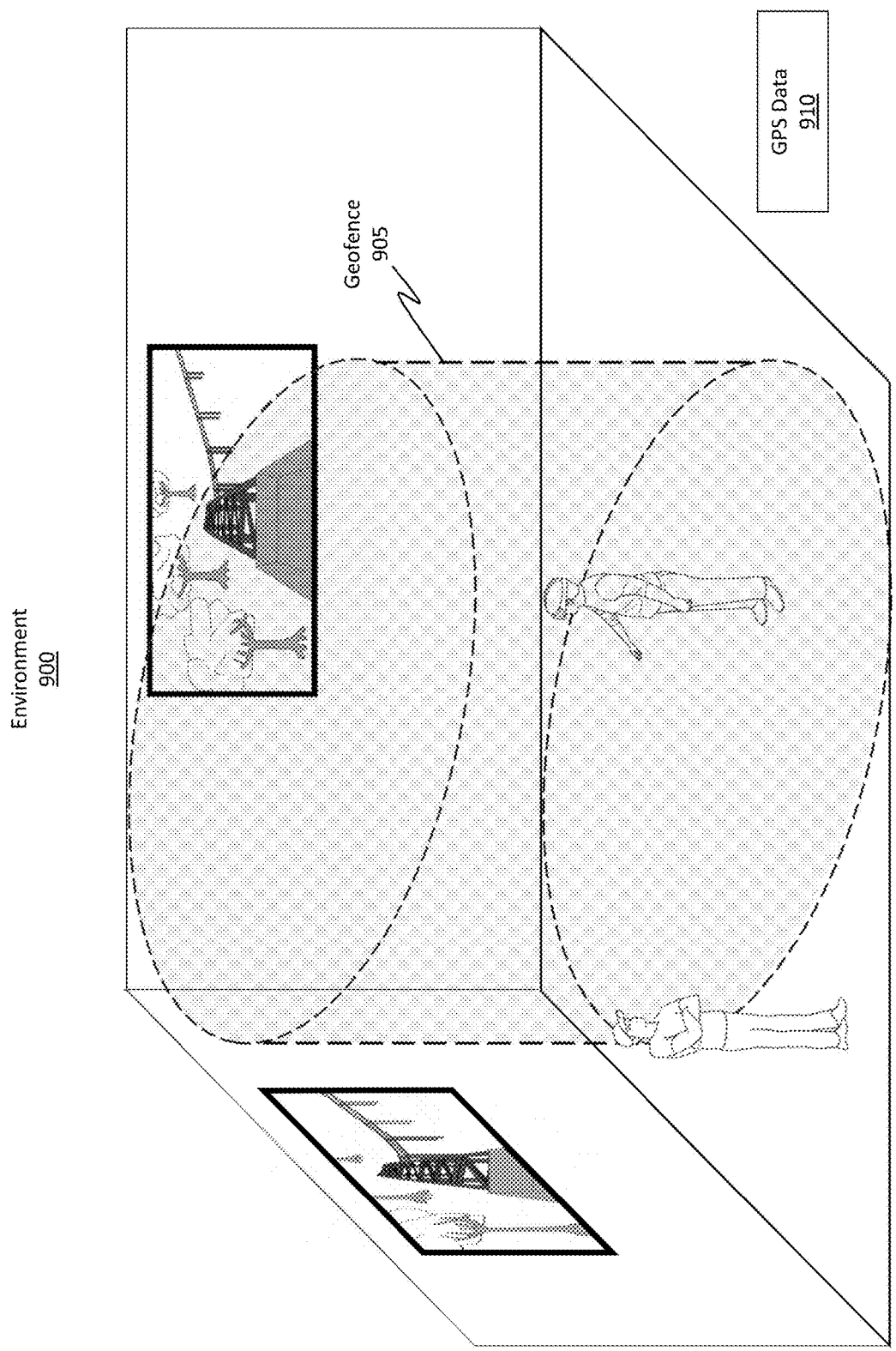
FIG. 9A illustrates the boundary can be generated based on different types of data, including scanning data or even global positioning system (GPS) data.

FIG. 9A shows another environment 900 in which a geofence 905 boundary is provided. In some cases, geofence 905 can be generated based on scanning data (as described earlier) while in other cases geofence 905 can be generated based on GPS data 910. For instance, if the GPS coordinates of environment 900 can be obtained, then the GPS data 910 can be used to determine where and how to place geofence 905.

Additionally, or alternatively, any other type of position-related information may be used to place geofence 905. As an example, if environment 900 includes a radio or communications network or is structured to allow such radio waves to pass through environment 900, then signal strength or triangulation data can be used to determine where to place geofence 905. Specifically, the HMD's signal strength relative to a router can be used to determine where to place the geofence 905. Relatedly, the HMD's telecommunications radio strength relative to any number of cell towers can be used to help determine where to place geofence 905.

Figure 9B:
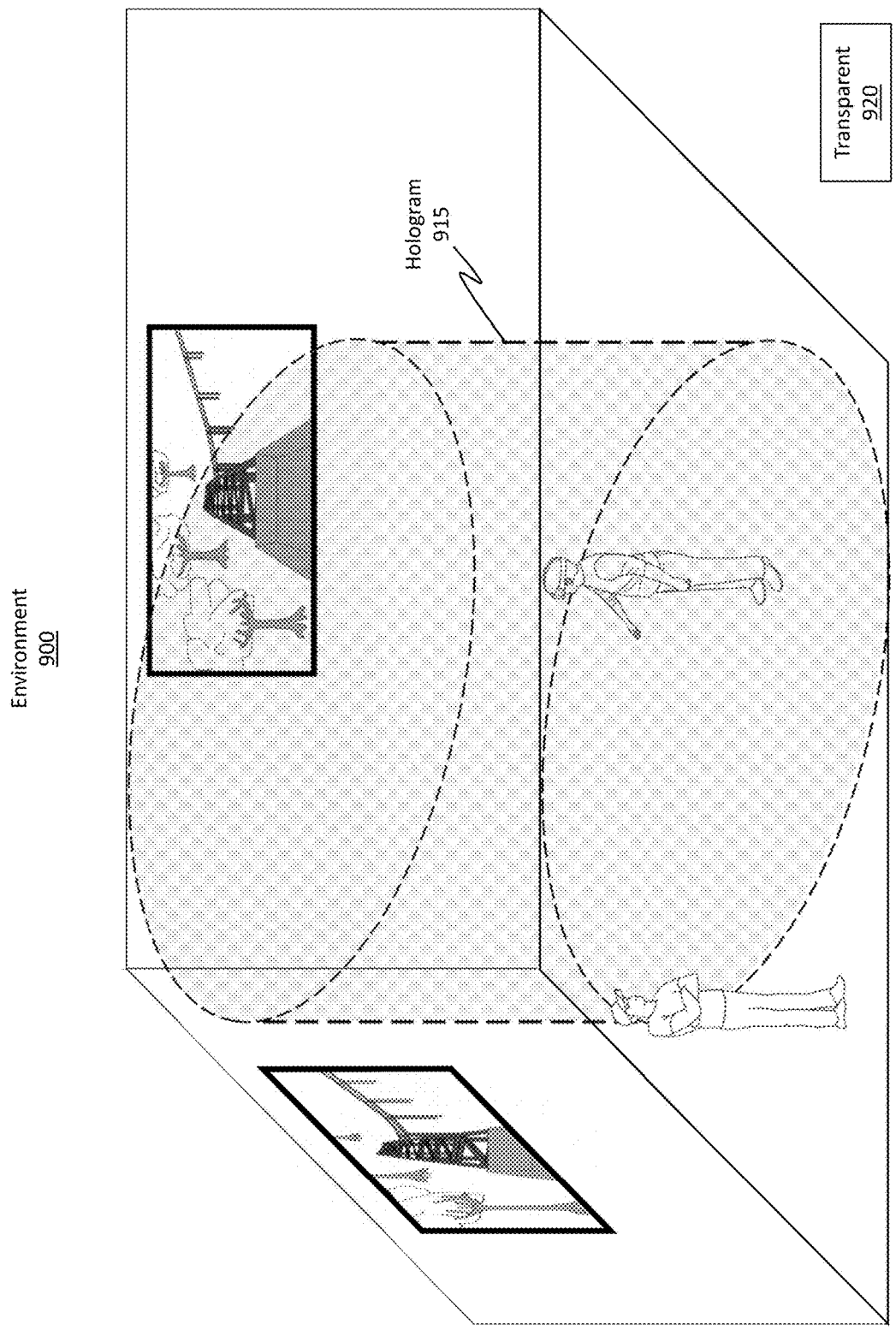
FIG. 9B illustrates how a virtual image or hologram can be projected so that a user wearing an HMD can visually see where the virtual boundary is located.

In some cases, as shown in FIG. 9B, a hologram 915 can be rendered and projected at a location corresponding to geofence 905 of FIG. 9A (i.e. the embodiments can render a hologram 915 to visually represent geofence 905). To clarify, when the boundary is a virtual boundary, such as a geofence, then a user of the HMD may not be able to visually identify where the boundary is located. In some cases, not being able to see the boundary/geofence is beneficial (e.g., because it may cause distractions) while in other cases it may be desirable to see where geofence 905 is located. Therefore, some embodiments beneficially project a hologram 915 at the location where geofence 905 is positioned.

As shown by transparent 920, hologram 915 can be at least partially transparent such that the regions beyond the boundary (i.e. the so-called "second region") is at least partially visible. As a consequence, the user of the HMD may be able to at least partially see any spectators outside of the geofence 905 (e.g., in an AR scenario). By way of example, the boundary may be an invisible geofence and the disclosed operations may be performed by an AR system.

Figure 9C:
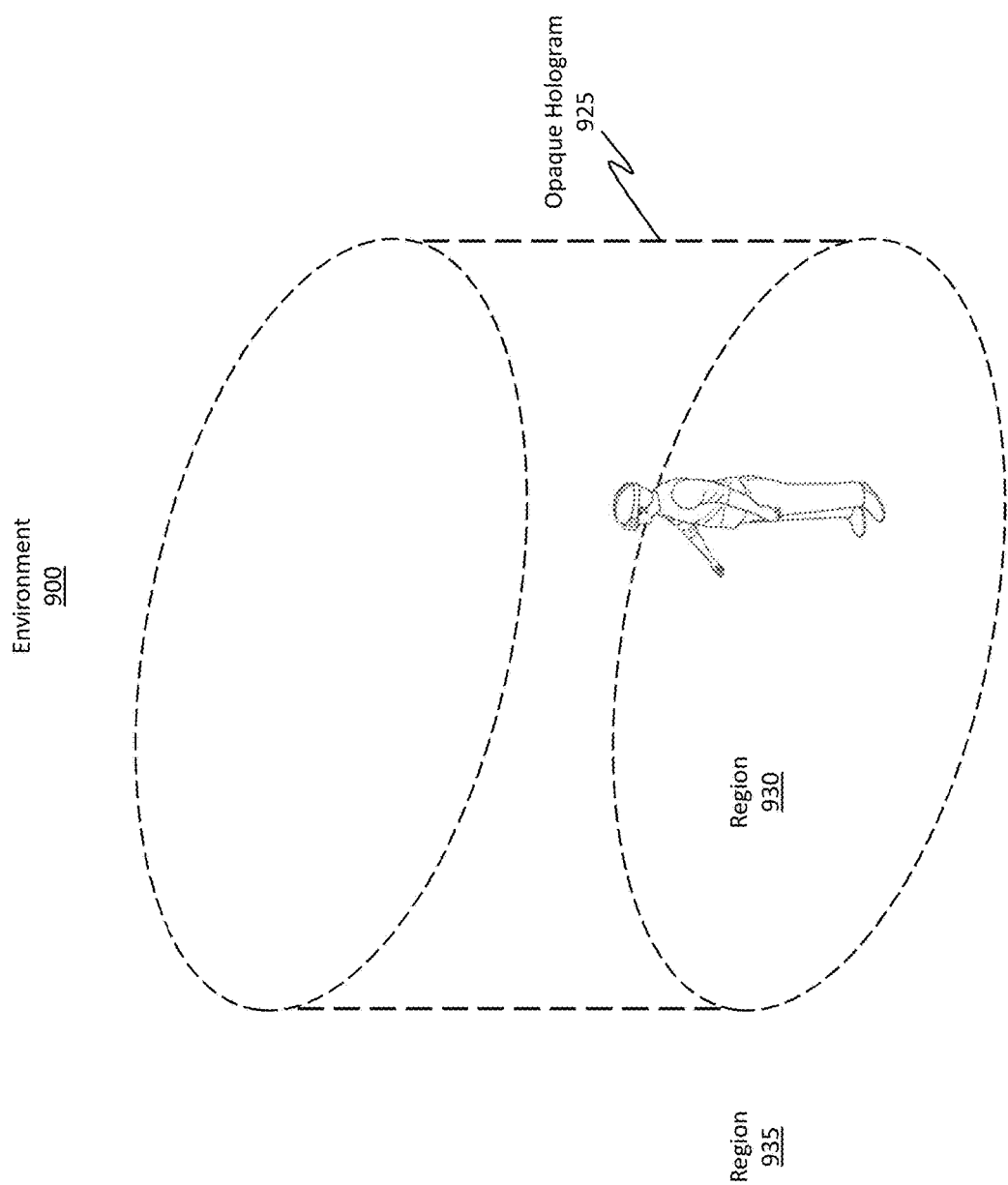
FIG. 9C illustrates how the hologram of the boundary can be entirely opaque so as to restrict the user's view to only regions extending up to, but not beyond (or positioned on the other side), of the boundary.

In some cases, the disclosed operations include rendering an opaque hologram to visually represent the invisible geofence such that the second region is occluded by the opaque hologram in an AR scene generated by the AR system. To clarify, in some embodiments, the hologram may be entirely opaque, as shown in FIG. 9C. In this scenario, instead of rendering a transparent (or at least partially transparent) hologram, the embodiments have rendered an opaque hologram 925 at the location corresponding to geofence 905. This opaque hologram 925 may be configured to entirely occlude regions extending beyond geofence 905. For instance, by rendering the opaque hologram 925, the user will be able to see objects included in region 930 (i.e. the area surrounded by or included within the geofence 905) (i.e. the so-called "first region") but will not be able to see objects included in region 935 (i.e. the area outside of the geofence 905) (i.e. the so-called "second region"). It will be appreciated that these holograms (e.g., hologram 915 from FIG. 9B and opaque hologram 925 from FIG. 9C) may be provided in an AR scene scenario in which the user can observe the real-world environments. In VR scenarios, however, it may not be beneficial or worthwhile to render these holograms because the user's view of the real world is entirely blocked by the HMD.

Additional Attributes of Boundaries

FIG. 10 shows some additional details regarding how a boundary can be constructed. Specifically, FIG. 10 shows an environment 1000 that includes a transparent glass window (e.g., glass 1005). Through this window, the outside can be observed (e.g., the outdoor tree in the background is visible). In some cases, it may be desirable to restrict the scanning of the HMD to include only scanning data corresponding to inside environment 1000 and to not include scanning data corresponding to outside the environment 1000 (e.g., the tree). As a consequence, the boundary may include (among other things) or may be comprised of transparent glass.

Although humans are able to readily identify a see-through window and distinguish between inside objects and outside objects, this discernment process can be more difficult for a computer system to achieve. The disclosed embodiments, however, help improve this discernment through the use of boundaries. In particular, any type of boundary may be used.

For example, if the HMD is positioned far enough away from the window, then the embodiments can use the outer frame of the window as the boundary or even any number or type of other anchor points within the environment. Once the depth of the frame is determined, then the embodiments can impose or impute depths for the frame to the areas of the transparent glass 1005 and then selectively filter out depth scanning data for objects that are positioned or that have depths greater than the depth value of the window frame.

In some embodiments, as will be discussed in more detail later, a lattice 1010 or other type of framework may be used as the boundary or as a part of the boundary. In FIG. 10, lattice 1010 is shown as being included as a part of the window. In this regard, the lattice 1010 is disposed over at least a portion of transparent glass 1005. The embodiments are able to use lattice 1010 as a point of reference, or rather as the boundary, to determine where to cut off the 3D representation (e.g., by selectively filtering out depth data for the region in which the tree is positioned). Furthermore, the embodiments are able to use the lattice to distinguish between different regions of the environment. Accordingly, the embodiments are highly configurable and can use any type of boundary to distinguish between regions. Further details on the use of a lattice or similar framework will be provided later on in this disclosure.

Boundaries in Vehicles

Figure 11:
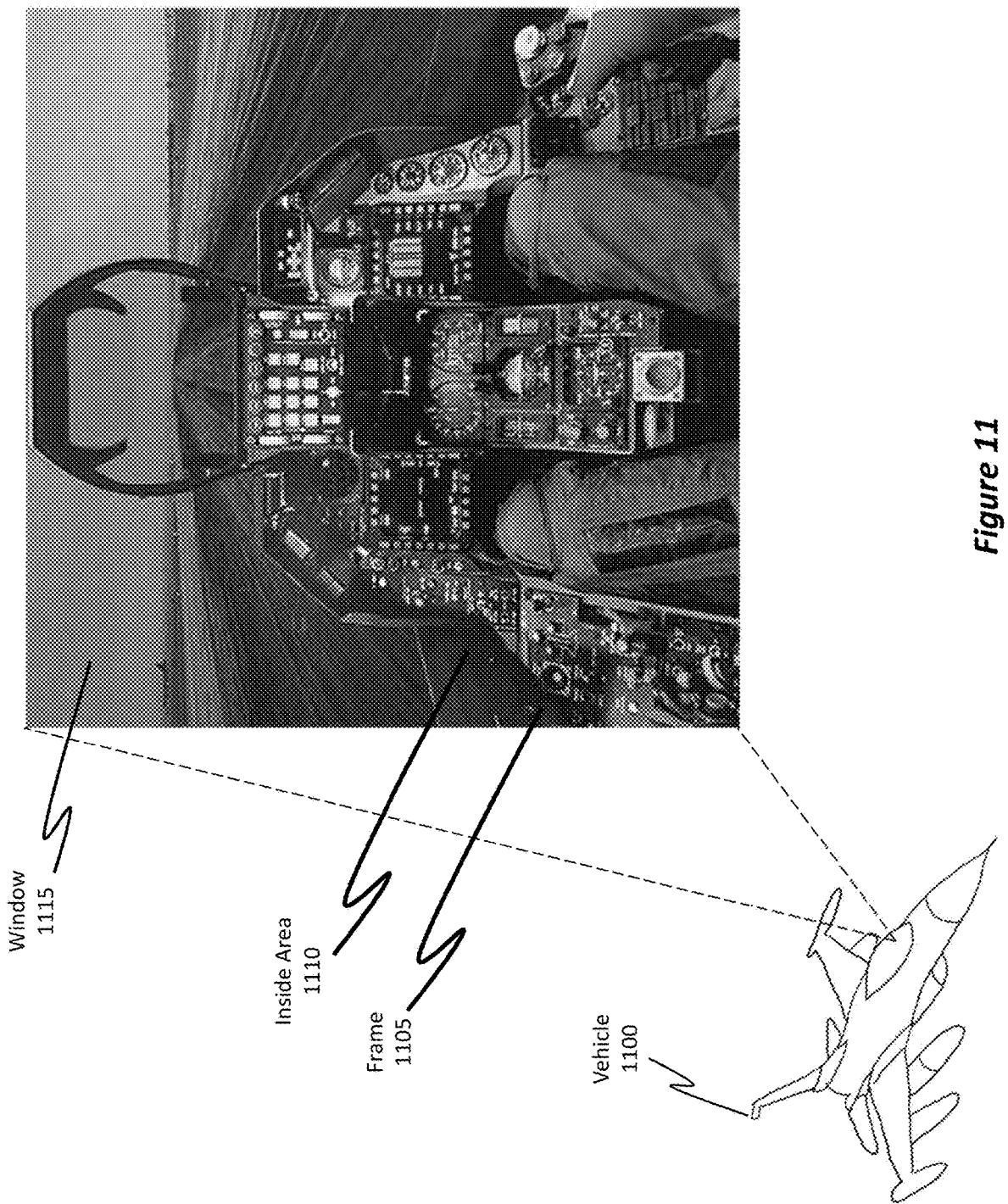
FIG. 11 illustrates how the disclosed principles can be used in the context of vehicles, including cars, planes, trains, or any other type of vehicle.

FIG. 11 shows how the disclosed principles can also be performed in connection with any type of vehicle 1100 (e.g., a car, airplane, train, etc.). Vehicle 1100 is shown as having a frame 1105, an inside area 1110, and a window 1115. Through the window 1115, the outside environment can be observed. Because vehicles often move, it is often desirable to map out only the inside area 1110 and to refrain from mapping out the external environment. In this regard, the environment that is desired to be scanned may be an inside area of a frame of a vehicle, and the boundary may include the frame of the vehicle, including any windows of the vehicle.

In accordance with the disclosed principles, the embodiments are able to distinguish between different regions (e.g., the inside area 1110 and the outside area beyond the window 1115). To do so, window 1115 can operate as a barrier. To cause window 1115 to operate as a barrier, some embodiments scan the surrounding the entire environment (e.g., both the inside area 1110 and at least some of the external environment) to generate scanning data.

Once this scanning data is acquired, then the embodiments can identify depths corresponding to the inside area 1110. Additionally, the embodiments can identify depths corresponding to the outside area. Of note, the depths for the inside area 1110 will be substantially closer than the depths for the outside area. Furthermore, if the vehicle 1100 is moving, then the depths for the outside area may be skewed, inaccurate, or otherwise ghosted. By imputing the depths for the frame 1105 to the area corresponding to the window 1115, the embodiments can configure the window 1115 to operate as the boundary. Subsequently, the embodiments can then selectively filter out the outside area depths and rely only on the depth data for the inside area 1110 to generate a 3D representation for the inside area 1110. In some cases, machine learning is performed to identify the transparent glass for use as the boundary while in other cases depth invariances can be used to identify glass (e.g., the depth for the cockpit is much closer than the depth of the runway, thereby leading to a large depth invariance).

While the above disclosure focused on imputing depths from surrounding areas (e.g., the frame 1105) onto the window 1115 to cause the window 1115 to act as a boundary, some embodiments rely on placing, attaching, or otherwise affixing a physical item onto window 1115 (or any transparent glass). For instance, a sticker or other type of marker with recognizable characteristics (e.g., a known or even random pattern) can be applied to the window 1115.

One or more of these stickers can be applied to the window to enable the scanning sensor to detect where the boundary is located. As such, any type of boundary may be used, even in scenarios involving windows and moving vehicles. Some embodiments may even use polarization on glass to establish the glass as the boundary. Some embodiments may emit ultraviolet (UV) light to strike off of the glass to identify the glass as a boundary. Additionally, some embodiments may emit a sound wave (e.g., sonar using an array of sound emitters) to strike the glass and record responses using an array of microphones in order to identify the glass as the boundary. Accordingly, numerous different techniques may be used to identify a boundary within an environment, where the boundary is relied on to determine which portions of scanning data to selectively filter.

Figure 12:
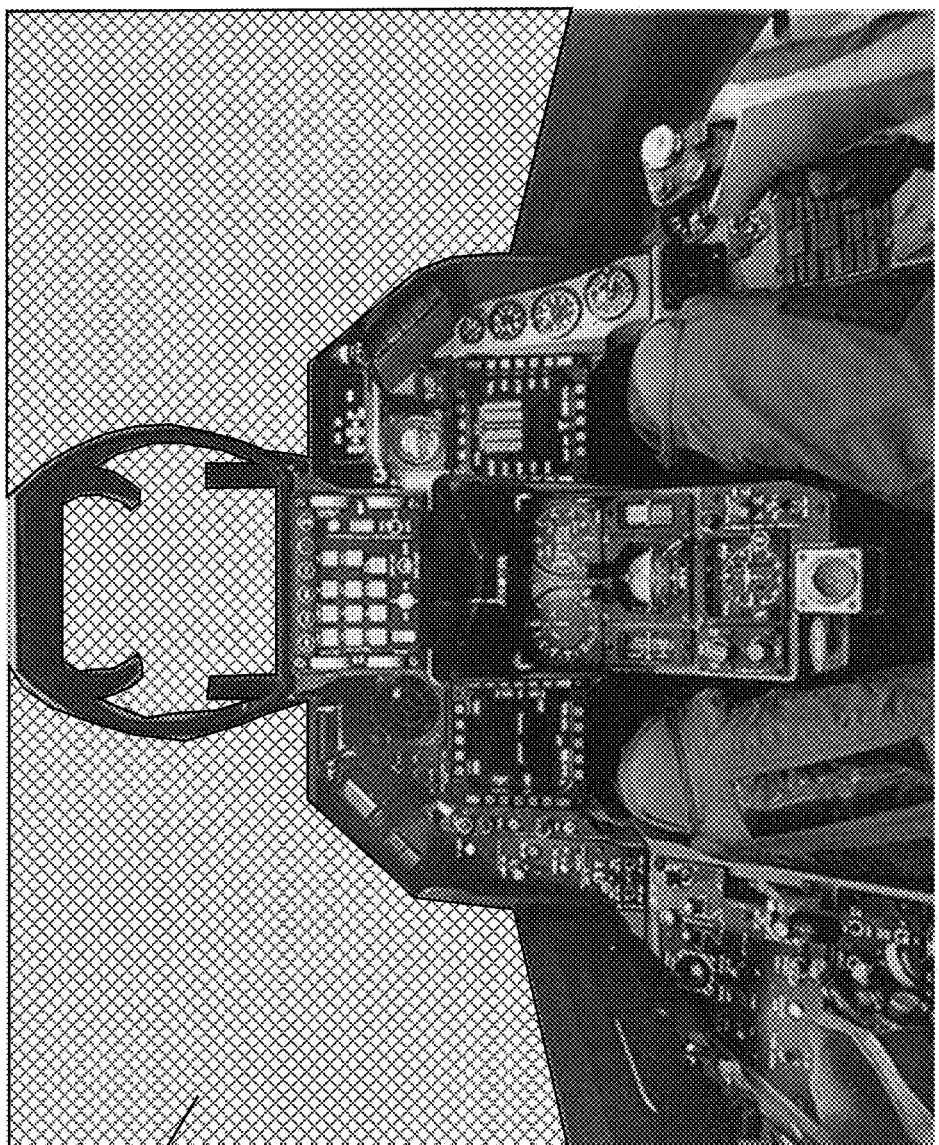
FIG. 12 illustrates how scanning data corresponding to regions located outside of the vehicle can be filtered so that the resulting 3D representation represents only the internal confines of the vehicle.

FIG. 12 shows the results of filtering certain data (e.g., data corresponding to the outside environment) in the context of a moving vehicle. Specifically, FIG. 12 shows filtered data 1200 corresponding to the outside environment. Because this filtered data 1200 is excluded from consideration during the buildup of the 3D representation of the vehicle, the resulting 3D representation is focused only on the internals of the vehicle and does not include data corresponding to the outside environment.

Flow Diagram for Distinguishing Regions

Figure 13:
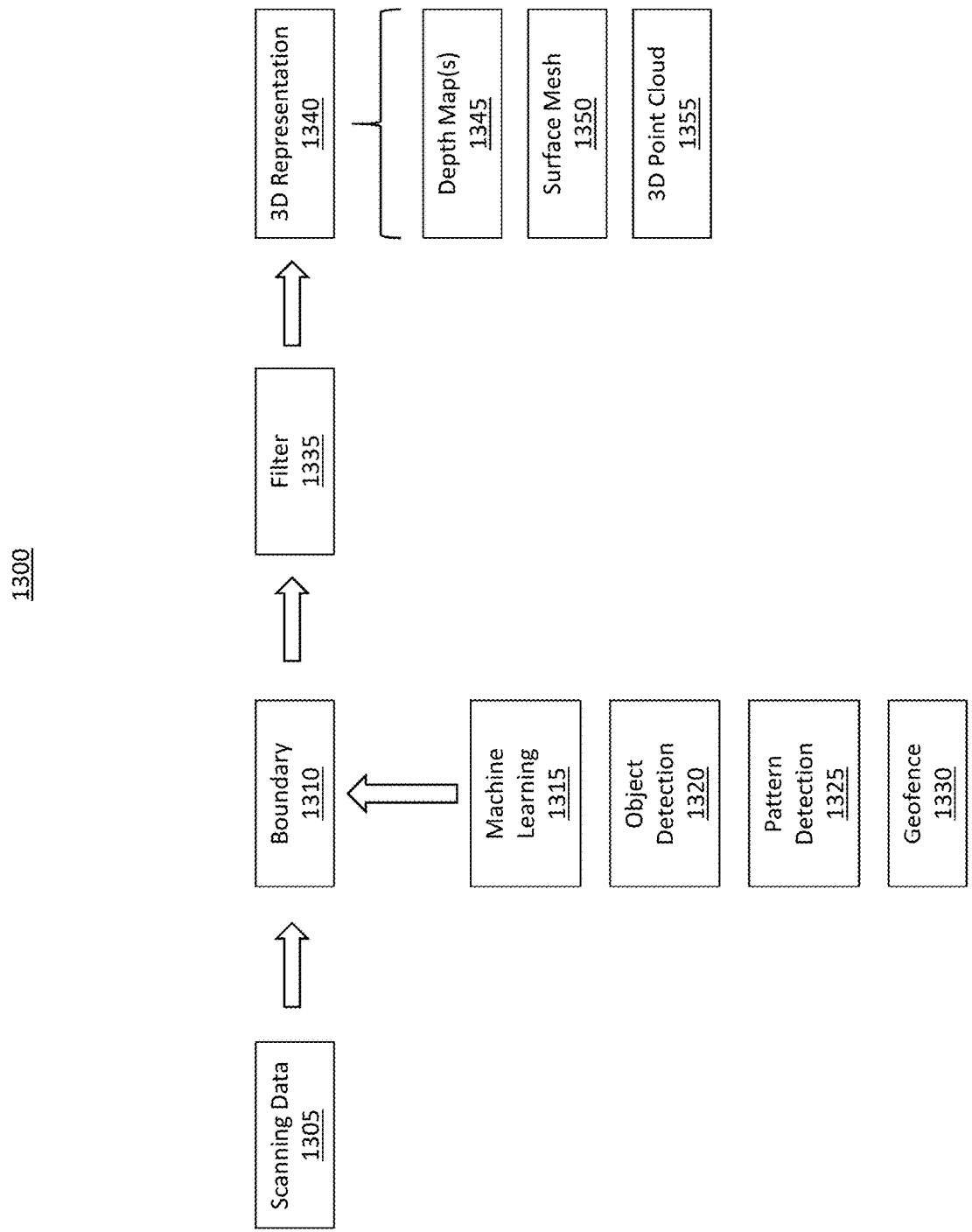
FIG. 13 illustrates a generalized flow diagram regarding how to selectively differentiate between different regions in an environment and how to structure a 3D representation to represent only one or more of those regions, but not all of those regions.

FIG. 13 illustrates a flow diagram 1300 that may be followed to selectively filter data using a boundary. Initially, flow diagram 1300 shows a step in which scanning data 1305 is obtained. Either based on the scanning data 1305 or based on some other factor (e.g., perhaps user input), a boundary 1310 is established or detected. This boundary 1310 can be identified or established via numerous different ways, some of which were discussed earlier.

As some additional examples, if the boundary 1310 is a real-world physical boundary, then it may be detected using machine learning 1315, objection detection 1320, or any form of pattern detection 1325. If the boundary is a virtual boundary (e.g., a geofence 1330), then it can be established programmatically. Accordingly, the boundary 1310 can be any type of boundary. As described above, the boundary may be a physical boundary comprising multiple see-through portions (e.g., as shown in FIG. 6) through which the scanning sensor can scan (at least partially) the region beyond the boundary (referred to herein as the "second region"). In some cases, the boundary 1310 is a virtual boundary, such as a geofence.

The size of the boundary 1310 can be set to any size. For instance, the size can be as large as a big pillar within a room or as small as a chain-link or bead-link pull cord for blinds on a window. The scanning sensor can be dynamically adapted to account for different sized boundaries. For instance, the resolution of the scanning sensors can be increased to detect relatively smaller physical boundaries (e.g., the bead-link pull cord) or the resolution can be decreased to detect relatively larger physical boundaries (e.g., the pillar). Balances between scanning resolution and boundary size can be achieved so as to not consume undesirable amounts of battery life or to generate oversized amounts of scanning data.

Once the boundary 1310 is identified, then the scanning data 1305 can be subject to a filtering operation, as shown by filter 1335. That is, the embodiments can refrain from filtering out depth data for regions between the scanning sensor and the boundary 1310. Additionally, the embodiments can filter out depth data for regions or objects that are beyond (i.e. that have depths beyond) the depth of the boundary. Thereafter, a 3D representation 1340 can be generated based on the filtered depth scanning data. This 3D representation 1340 can be of any type, including, but not limited to, depth map(s) 1345, a surface mesh 1350, and/or a 3D point cloud 1355.

Figure 14:
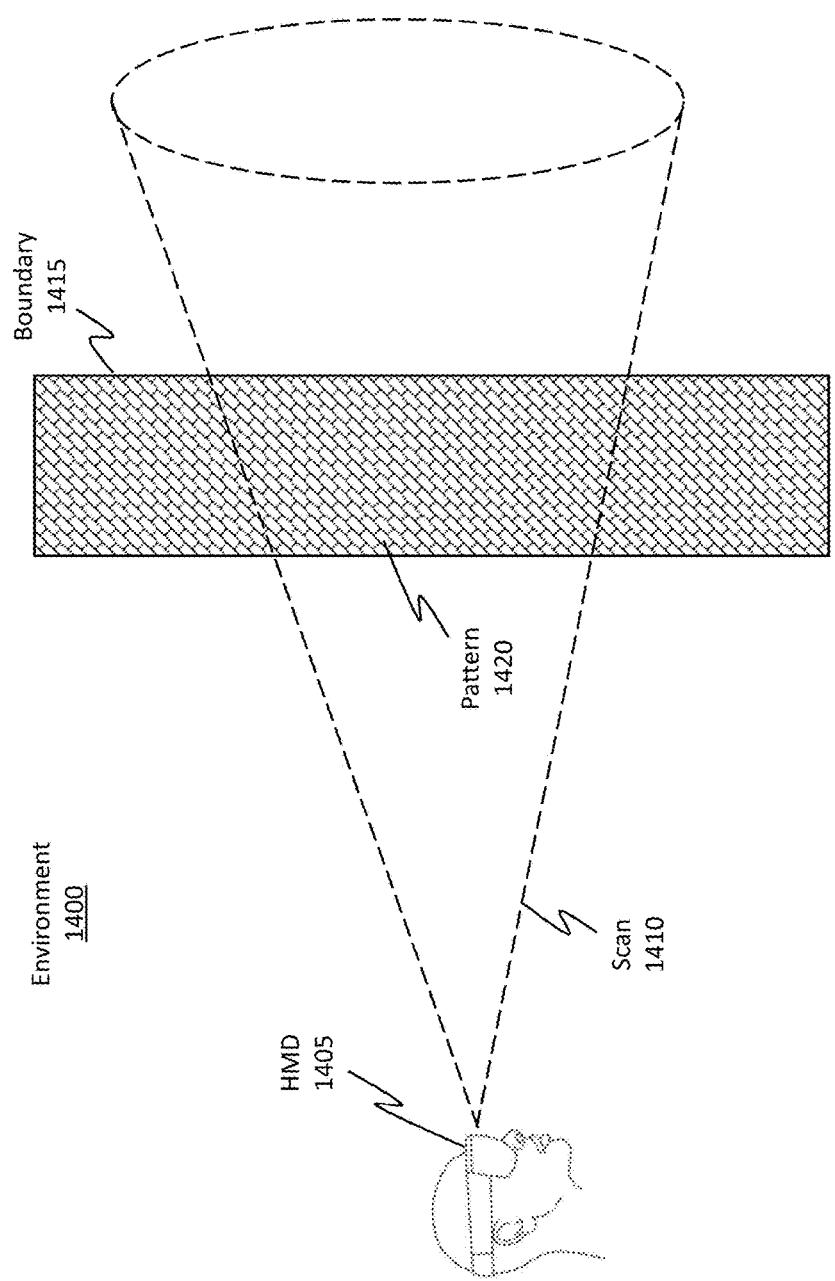
FIG. 14 illustrates another example scenario of how a boundary may include or be associated with any type of pattern, lattice, or framework.

FIG. 14 illustrates some additional attributes of the disclosed embodiments. Specifically, FIG. 14 shows an environment 1400 (which may be representative of any of the environments discussed thus far), an HMD 1405 performing a scan 1410, and a boundary 1415.

Notably, boundary 1415 is shown as including a pattern 1420. This pattern 1420 may be a known pattern that is known to the HMD 1405 beforehand or it may be detected during the scan 1410. Notably, any type of recognizable pattern may be used.

By way of example, pattern 1420 may include dots, straight lines, repeating illustrations or features, and so on. A lattice can be included or classified as being the pattern 1420. The pattern 1420 can even be used to differentiate between different sections of a boundary. For instance, the pattern 1420 can be used to different section 620A (which may have one type of pattern) from sections 620B and 620C (which may have other types of patterns) in FIG. 6.

In some cases, the pattern 1420 may be inherent to the physical boundary (thus the boundary is identified by detecting a pattern inherent to the boundary). In some implementations, the pattern 1420 may be affixed to an object, such as by affixing a QR code, bar code, hatch pattern, or any other recognizable code.

In some cases, the pattern 1420 may be a machine generated pattern (e.g., structured light projected onto a surface). By way of example, the disclosure previously discussed how structured light 125 in FIG. 1 can be used to add texture (e.g., infrared IR light) to an environment to better compute depths for smooth surfaces or low-reflective surfaces. In a similar notion, pattern 1420 may be comprised of computer-generated texture, such as an IR light pattern that is projected onto a physical boundary to facilitate or help with the boundary identification process. Some embodiments initially know the pattern and then, by identifying distortions of the pattern when the pattern hits an object, the embodiments can determine depth characteristics related to that object.

Some embodiments, in addition to selectively filtering out data based on the boundary position, also selectively control an illumination emitter or source based on the position of the boundary. For example, suppose the boundary is located some distance from the scanning sensor or HMD (e.g., suppose 3 meters). The embodiments are able to control the sensor's illuminator to emit an illumination that adequately illuminates objects up to the 3-meter line/boundary, but then may not provide adequate illumination for objects beyond the 3-meter line. In this regard, the embodiments can base an illumination intensity or strength on the boundary position as well.

The disclosed operations can be performed by any room scanning device and not just an HMD. For instance, a security camera might be blocked from recording anything that occurs beyond a given window or chain-link fence. In some cases, a window can be turned into a type of green screen or perhaps can be used to refrain from using scanning data for outside objects in the resulting 3D representation.

Accordingly, the disclosed embodiments bring about numerous benefits to the technical field. Indeed, the embodiments are able to selectively differentiate between regions of an environment based on a boundary. Using the boundary, the embodiments can then customize a resulting 3D representation to represent one or some regions while preventing the 3D representation from representing certain other regions of the environment. Such operations prevent the occurrence of so-called "moving walls" or ghosting effects from being added into the 3D representation. It should be noted that any of the disclosed operations or features can be used in conjunction with any of the other disclosed operations or features. Any combinations of features can also be used as well.

Example Computer Systems

Figure 15:
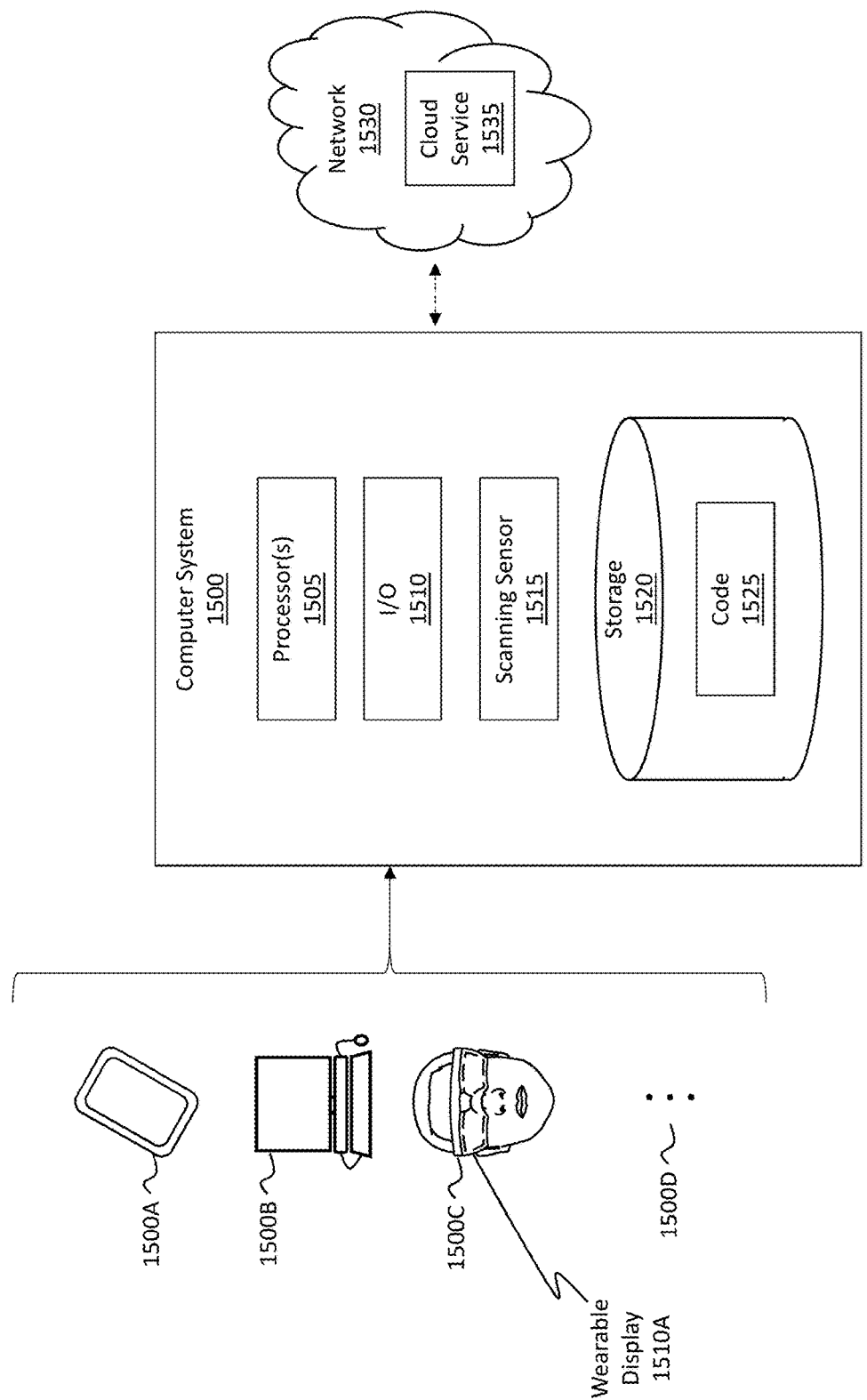
FIG. 15 illustrates an example computer system or architecture that can be used to perform any of the disclosed operations.

Attention will now be directed to FIG. 15 which illustrates an example computer system 1500 that may include and/or be used to perform the operations described herein. In particular, this computer system 1500 may be in the form of the MR systems/devices that were described earlier. As such, the computer system may be one of the following: a virtual-reality system, an augmented-reality system, or even any type of other scanning sensor.

Computer system 1500 may take various different forms. For example, in FIG. 15, computer system 1500 may be embodied as a tablet 1500A, a desktop 1500B, or an HMD 1500C (with a corresponding wearable display), such as those described throughout this disclosure. The ellipsis 1500D demonstrates that computer system 1500 may be embodied in any form, including any type of scanning sensor.

Computer system 1500 may also be a distributed system that includes one or more connected computing components/devices that are in communication with computer system 1500, a laptop computer, a mobile phone, a server, a data center, and/or any other computer system. The ellipsis 1500D also indicates that other system subcomponents may be included or attached with the computer system 1500, including, for example, sensors that are configured to detect sensor data such as user attributes (e.g., heart rate sensors), as well as sensors like cameras and other sensors that are configured to detect sensor data such as environmental conditions and location/positioning (e.g., clocks, pressure sensors, temperature sensors, gyroscopes, accelerometers and so forth), all of which sensor data may comprise different types of information used during application of the disclosed embodiments. Some of the embodiments are implemented as handheld devices or handheld depth cameras. Some embodiments are also operable in robotics, drones, ambient settings, and any type of mobile phone.

In its most basic configuration, computer system 1500 includes various different components. FIG. 15 shows that computer system 1500 includes at least one processor(s) 1505 (aka a "hardware processing unit"), input/output ("I/O") 1510, scanning sensor 1515, and storage 1520.

I/O 1510 may include any number of input/output devices, including wearable or handheld devices. I/O 1510 may also include a wearable display (e.g., wearable display 1510A), which may be used to render virtual content. Scanning sensor 1515 may include any number of cameras, including head tracking, hand tracking, depth detection, or any other type of camera. It may also include any type of light emitting illuminator, which can be configured to emit illumination to illuminate an environment to facilitate the scanning operations. Scanning sensor 1515 may perform any of the disclosed scanning, mapping, or depth detection processes.

Storage 1520 is shown as including executable code/instructions 1525. The executable code/instructions 1525 represent instructions that are executable by computer system 1500 to perform the disclosed operations, such as those described in the various methods.

Storage 1520 may be physical system memory, which may be volatile, non-volatile, or some combination of the two. The term "memory" may also be used herein to refer to non-volatile mass storage such as physical storage media. If computer system 1500 is distributed, the processing, memory, and/or storage capability may be distributed as well. As used herein, the term "executable module," "executable component," or even "component" can refer to software objects, routines, or methods that may be executed on computer system 1500. The different components, modules, engines, and services described herein may be implemented as objects or processors that execute on computer system 1500 (e.g. as separate threads).

The disclosed embodiments may comprise or utilize a special-purpose or general-purpose computer including computer hardware, such as, for example, one or more processors (such as processor(s) 1505) and system memory (such as storage 1520), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1500 may also be connected (via a wired or wireless connection) to external sensors (e.g., one or more remote cameras, accelerometers, gyroscopes, acoustic sensors, magnetometers, etc.) or devices via a network 1530. For example, computer system 1500 can communicate the cloud to obtain any number of previous depth maps, as described earlier. In some cases, network 1530 may be a cloud network and may include a cloud service 1535. This disclosure earlier mentioned how scanning data can be uploaded to a cloud service (e.g., cloud service 1535). Here, cloud service 1535 may be configured to perform any of the disclosed operations, including method 400 of FIG. 4. In some cases, the scanning data can be received by the cloud service 1535 from an HMD. Additionally, when the disclosed operations are performed by the cloud service 1535 (which is operating in a cloud environment), then those methods may include an additional act of permitting an HMD to subsequently access the 3D representation. Additionally, or alternatively, computer system 1500 (and specifically the HMD 1500C) may be configured to perform method 400 or any of the other operations.

Furthermore, computer system 1500 may also be connected through one or more wired or wireless networks 1530 to remote/separate computer systems(s) that are configured to perform any of the processing described with regard to computer system 1500.

During use, a user of computer system 1500 can perceive information (e.g., an MR scene/environment (including VR or AR)) through a display screen that is included with the I/O 1510 of computer system 1500 and that is visible to the user. The I/O 1510 and sensors with the I/O 1510 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the mixed-reality environment.

A graphics rendering engine may also be configured, with processor(s) 1505, to render one or more virtual objects within an MR scene. As a result, the virtual objects accurately move in response to a movement of the user and/or in response to user input as the user interacts within the virtual scene.

A "network," like the network 1530 shown in FIG. 15, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1500 will include one or more communication channels that are used to communicate with the network 1530. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor(s) 1505). For example, and without limitation, illustrative types of hardware logic components that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
    a processor; and
    a computer-readable hardware storage device having stored thereon computer-executable instructions that are executable by the processor to cause the computer system to:
        access scanning data generated by a scanning sensor that scanned an environment, the scanning data comprising depth information used to generate a three-dimensional (3D) representation of the environment;
        identify a boundary associated with the environment, the boundary being provided to divide the environment into at least two regions, including (i) a first region that is at least partially scanned by the scanning sensor and that extends only up to the boundary and (ii) a second region that is also at least partially scanned by the scanning sensor and that originates at and extends beyond the boundary;
        based on the identified boundary, classify a first portion of the scanning data as corresponding to the first region and classify a second portion of the scanning data as corresponding to the second region; and
        after filtering the second portion of the scanning data from the scanning data, use the filtered scanning data to generate the 3D representation of the environment such that the 3D representation is limited by the boundary and is visually representative of the first region but not the second region even though the second region was at least partially scanned by the scanning sensor.

2. The computer system of claim 1, wherein the 3D representation of the environment is one of: a depth map, a surface reconstruction mesh, or a 3D point cloud.

3. The computer system of claim 1, wherein the boundary is a physical boundary comprising a plurality of see-through portions through which the scanning sensor at least partially scans the second region.

4. The computer system of claim 1, wherein the boundary is a geofence.

5. The computer system of claim 4, wherein execution of the computer-executable instructions further causes the computer system to:
    render a hologram to visually represent the geofence.

6. The computer system of claim 5, wherein the hologram is at least partially transparent such that the second region is at least partially visible.

7. The computer system of claim 5, wherein the hologram is opaque and entirely occludes the second region.

8. The computer system of claim 1, wherein the second portion of the scanning data includes data describing a dynamic object located in the second region extending beyond the boundary, and wherein the data describing the dynamic object is filtered such that the data is refrained from being used to generate the 3D representation.

9. The computer system of claim 1, wherein the environment is an inside area of a frame of a vehicle, and wherein the boundary includes the frame of the vehicle, including any windows of the vehicle.

10. The computer system of claim 1, wherein the boundary is identified by detecting a pattern inherent to the boundary.

11. A method for differentiating between different regions in an environment and for selectively using scanning data of the environment to generate a three-dimensional (3D) representation of at least one, but not all, of the regions of the environment, said method comprising:
    accessing scanning data generated by a scanning sensor that scanned an environment, the scanning data comprising depth information used to generate a three-dimensional (3D) representation of the environment;
    identifying a boundary associated with the environment, the boundary being provided to divide the environment into at least two regions, including (i) a first region that is at least partially scanned by the scanning sensor and that extends only up to the boundary and (ii) a second region that is also at least partially scanned by the scanning sensor and that originates at and extends beyond the boundary;
    based on the identified boundary, classifying a first portion of the scanning data as corresponding to the first region and classify a second portion of the scanning data as corresponding to the second region; and
    after filtering the second portion of the scanning data from the scanning data, using the filtered scanning data to generate the 3D representation of the environment such that the 3D representation is limited by the boundary and is visually representative of the first region but not the second region even though the second region was at least partially scanned by the scanning sensor.

12. The method of claim 11, wherein the scanning sensor is a part of a head-mounted device (HMD), and wherein the HMD uses the scanning sensor to scan the environment.

13. The method of claim 11, wherein the method is performed by a cloud service operating in a cloud environment, and wherein the scanning data is received at the cloud service from a head-mounted device (HMD).

14. The method of claim 11, wherein the method is performed by a cloud service operating in a cloud environment, and wherein the method further includes permitting an HMD to subsequently access the 3D representation.

15. The method of claim 11, wherein the boundary is comprised of transparent glass.

16. The method of claim 15, wherein a lattice is disposed over at least a portion of the transparent glass, and wherein the method further includes:
    using the lattice to distinguish between the first region and the second region.

17. The method of claim 15, wherein the scanning sensor is one of a time-of-flight depth sensor, an active illumination stereoscopic camera system, or a passive stereoscopic camera system, and wherein machine learning is performed to identify the transparent glass for use as the boundary.

18. The method of claim 11, wherein the boundary is an invisible geofence, wherein the method is performed by an augmented-reality (AR) system, and wherein the method further includes rendering an opaque hologram to visually represent the invisible geofence such that the second region is occluded by the opaque hologram in an AR scene generated by the AR system.

19. A head-mounted device (HMD) comprising:
- a wearable display;
- a scanning sensor;
- a processor; and
- a computer-readable hardware storage device having stored thereon computer-executable instructions that are executable by the processor to cause the HMD to:
  - use the scanning sensor to scan an environment to obtain scanning data, the scanning data comprising depth information used to generate a three-dimensional (3D) representation of the environment;
  - identify a boundary associated with the environment, the boundary being provided to divide the environment into at least two regions, including (i) a first region that is at least partially scanned by the scanning sensor and that extends only up to the boundary and (ii) a second region that is also at least partially scanned by the scanning sensor and that originates at and extends beyond the boundary;
  - based on the identified boundary, classify a first portion of the scanning data as corresponding to the first region and classify a second portion of the scanning data as corresponding to the second region; and
  - after filtering the second portion of the scanning data from the scanning data, use the filtered scanning data to generate the 3D representation of the environment such that the 3D representation is limited by the boundary and is visually representative of the first region but not the second region even though the second region was at least partially scanned by the scanning sensor.

20. The HMD of claim 19, wherein the HMD is either a virtual-reality (VR) system or an augmented-reality (AR) system.

\* \* \* \* \*